US011182216B2

(12) United States Patent
McWeeney

(10) Patent No.: US 11,182,216 B2
(45) Date of Patent: Nov. 23, 2021

(54) AUTO-SCALING CLOUD-BASED COMPUTING CLUSTERS DYNAMICALLY USING MULTIPLE SCALING DECISION MAKERS

(71) Applicant: Adobe Inc., San Jose, CA (US)

(72) Inventor: Daniel McWeeney, New York, NY (US)

(73) Assignee: Adobe Inc., San Jose, CA (US)

( * ) Notice: Subject to any disclaimer, the term of this patent is extended or adjusted under 35 U.S.C. 154(b) by 106 days.

(21) Appl. No.: 16/597,267

(22) Filed: Oct. 9, 2019

(65) Prior Publication Data

US 2021/0109789 A1 Apr. 15, 2021

(51) Int. Cl.
*G06F 9/50* (2006.01)
(52) U.S. Cl.
CPC .......... *G06F 9/5027* (2013.01); *G06F 9/5022* (2013.01); *G06F 9/5072* (2013.01); *G06F 9/5083* (2013.01); *G06F 2209/503* (2013.01); *G06F 2209/508* (2013.01)
(58) Field of Classification Search
CPC .... G06F 9/5027; G06F 9/5083; G06F 9/5072; G06F 9/5022; G06F 2209/503; G06F 2209/508
See application file for complete search history.

(56) References Cited

U.S. PATENT DOCUMENTS

2018/0302340 A1\* 10/2018 Alvarez Callau ....... H04L 47/76

OTHER PUBLICATIONS

"AWS Auto Scaling Features"; Date Downloaded Nov. 14, 2019; https://aws.amazon.com/autoscaling/features/.
"Azure Autoscale"; Date Downloaded Nov. 14, 2019; https://azure.microsoft.com/en-us/features/autoscale/.
Chen, Tao, et al. 2018. "A Survey and Taxonomy of Self-Aware and Self-Adaptive Cloud Autoscaling Systems." ACM Computing Surveys 3 (51): 1-40.
Lorido-Botran, Tania, et al. 2014. "A Review of Auto-Scaling Techniques for Elastic Applications in Cloud Environments." Journal of Grid Computing 12 (4): 559-59.
"Open Source Serverless Cloud Platform"; Date Downloaded Nov. 14, 2019; https://openwhisk.apache.org.

\* cited by examiner

*Primary Examiner* — Sisley N Kim
(74) *Attorney, Agent, or Firm* — Keller Jolley Preece

(57) ABSTRACT

Systems, methods, and non-transitory computer-readable media are disclosed for determining an accurate and efficient auto-scaling action for a cloud-based computing cluster based on multiple proposed auto-scaling actions from multiple scaling models. For example, the disclosed systems can determine an auto-scaling action to perform on a cloud-based computing cluster by weighing multiple proposed auto-scaling actions from multiple scaling models based on confidence scores associated with the proposed auto-scaling actions. Moreover, the disclosed systems can modify the cloud-based computing cluster using the determined auto-scaling action (e.g., to accurately and efficiently provision computing resources for a cloud-based computing system).

20 Claims, 9 Drawing Sheets

AUTO-SCALING CLOUD-BASED COMPUTING CLUSTERS DYNAMICALLY USING MULTIPLE SCALING DECISION MAKERS

BACKGROUND

Recent years have seen a significant increase in cloud-based computing (e.g., data storage and/or data centers for on-demand availability of computing resources) accessible to individuals and businesses through electronic devices. Indeed, this has led to the creation, storage, and/or processing of a large quantity of data via cloud-based computing. For instance, cloud-based computing often operates on large, complex scales and utilizes a significant amount of resources (e.g., computing resources and energy). As an example, cloud-based computing systems often operate on large, complex scales that utilize a varying number of cloud service providers and/or amount of computing resources that interconnect to create, store, and/or process data. Although conventional cloud management systems create, store, and/or process data, they also have a number of significant shortcomings, particularly in regard to accurately, efficiently, and easily provisioning computing resources for large, complex cloud-based computing systems.

SUMMARY

This disclosure describes one or more embodiments that provide benefits with systems, computer-readable media, and methods that dynamically scale a cloud-based computing cluster accurately and efficiently based on multiple proposed auto-scaling actions from multiple scaling decision makers. In particular, the disclosed systems can automatically scale one or more cloud-based computing clusters using a scaling strategy (e.g., an auto-scaling action) determined from proposed scaling strategies provided by multiple auto-scaling decisions makers (e.g., scaling models) and a confidence of each auto-scaling decision maker. For example, the disclosed system can determine multiple auto-scaling strategies (or recommendations) and confidence scores (or values) from multiple auto-scaling models for a cloud-based computing cluster. Then, the disclosed system can weigh the multiple auto-scaling strategies based on the confidence of each auto-scaling model to determine an auto-scaling strategy (or action) to perform on a cloud-based computing cluster. Moreover, the disclosed system can cause one or more cloud-based service providers (or cloud service providers) to modify (or prepare) one or more cloud-based computing clusters (e.g., increase and/or reduce the number of nodes in the one or more clusters) using the determined auto-scaling action. By doing so, the disclosed system can accurately and efficiently provision computing resources for a cloud-based computing system regardless of complexity and/or the number of cloud service providers operating with the cloud-based computing system.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings described below.

DETAILED DESCRIPTION

Figure 1:
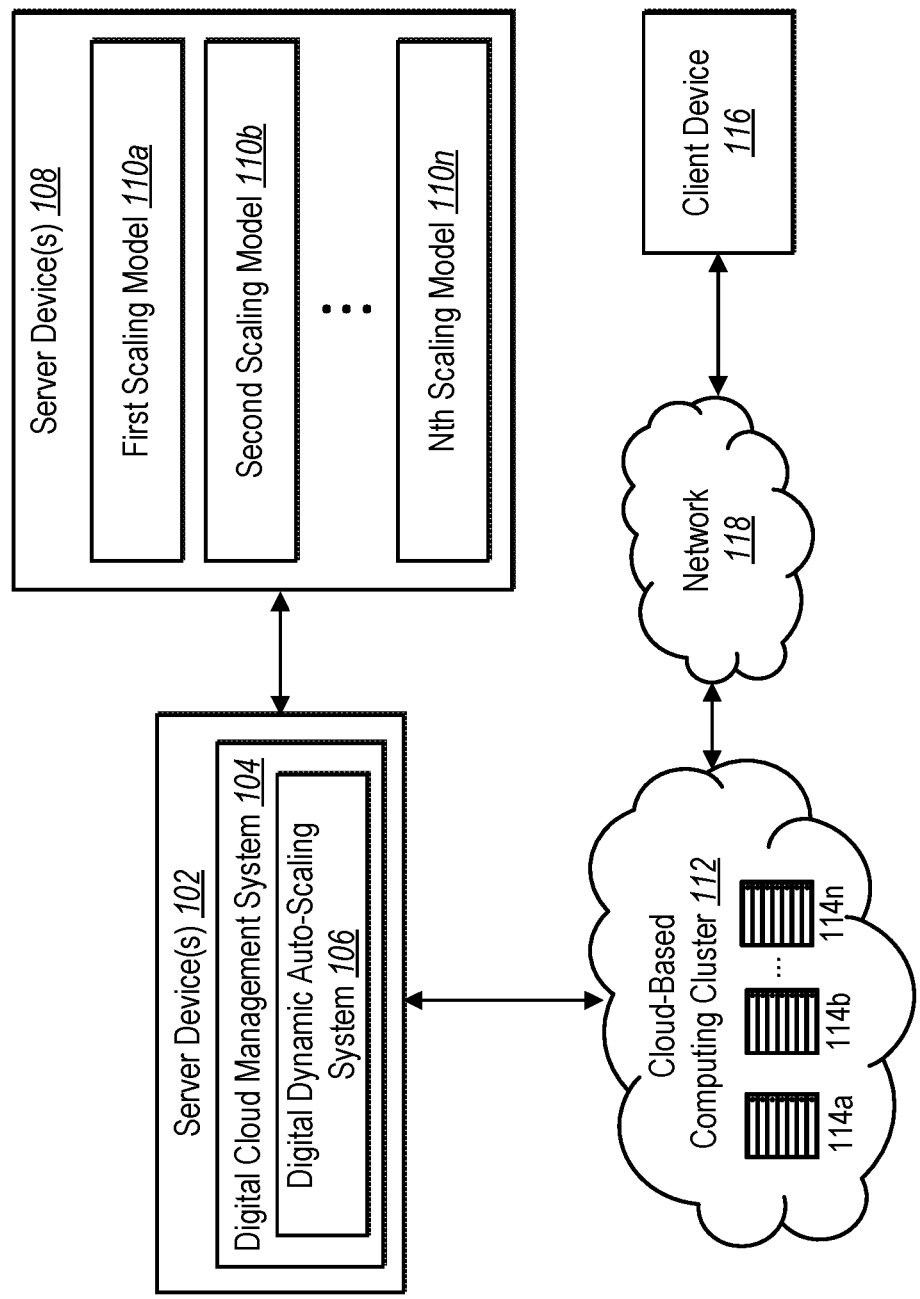
FIG. 1 illustrates a schematic diagram of an example system in which a digital dynamic auto-scaling system can operate in accordance with one or more embodiments.

One or more embodiments of the present disclosure include a digital dynamic auto-scaling system that can determine an accurate and efficient auto-scaling action for a cloud-based computing cluster based on multiple proposed auto-scaling actions from multiple scaling models (e.g., auto-scaling decision makers). In particular, the digital dynamic auto-scaling system can operate as a layer within a digital cloud management system that utilizes computing resources from one or more cloud-based service providers (or cloud service providers) having separate auto-scaling strategies. For example, the digital dynamic auto-scaling system can determine an auto-scaling action to perform on a cloud-based computing cluster by weighing multiple proposed auto-scaling actions from multiple scaling models based on confidence scores associated with the proposed auto-scaling actions. Accordingly, the digital dynamic auto-scaling system can accurately and efficiently allocate computing resources within a complex cloud-based computing cluster (or in between computing resources of multiple cloud service providers) regardless of auto-scaling actions (or strategies) utilized by the one or more cloud service providers corresponding to the cloud-based computing cluster.

In particular, the digital dynamic auto-scaling system can determine multiple proposed auto-scaling actions using multiple scaling models based on information associated with one or more cloud-based computing clusters. Moreover, in one or more embodiments, the digital dynamic auto-scaling system can also determine confidence scores associated with the multiple proposed auto-scaling actions from the multiple scaling models. Additionally, the digital dynamic auto-scaling system can determine an auto-scaling action to perform (on the one or more cloud-based computing clusters) based on the multiple proposed auto-scaling actions using their associated confidence scores. Finally, the digital dynamic auto-scaling system can modify the one or more cloud-based computing clusters based on the determined auto-scaling action.

As just mentioned, the digital dynamic auto-scaling system can determine multiple proposed auto-scaling actions and corresponding confidence scores using multiple scaling models. For instance, the digital dynamic auto-scaling system can provide information associated with one or more cloud-based computing clusters to the multiple scaling models. Moreover, the digital dynamic auto-scaling system can use the provided information to determine a proposed auto-scaling action from each scaling model (e.g., scaling models that utilize differing methods to determine an auto-scaling strategy). Furthermore, the digital auto-scaling system can also determine a confidence score associated with each of the proposed auto-scaling actions (e.g., each confidence score determined by the corresponding scaling models).

Then, the digital dynamic auto-scaling system can determine an auto-scaling action to perform on the one or more cloud-based computing clusters based on the multiple proposed auto-scaling actions. For instance, the digital dynamic auto-scaling system can select between the proposed auto-scaling actions by comparing the confidence scores associated with each of the proposed auto-scaling actions. As an example, the digital dynamic auto-scaling system can select a proposed auto-scaling action having the highest confidence score (e.g., the confidence score corresponding to the likelihood of accuracy) as the determined auto-scaling action to perform on the one or more cloud-based computing clusters.

Furthermore, the digital dynamic auto-scaling system can modify the one or more cloud-based computing clusters based on the determined auto-scaling action. For instance, the digital dynamic auto-scaling system can modify a computer resource allocation associated with the one or more cloud-based computing clusters based on the determined auto-scaling action. As an example, the digital dynamic auto-scaling system can increase or reduce computing resources (or nodes) associated with the one or more cloud-based computing clusters. More specifically, the digital dynamic auto-scaling system can modify the one or more cloud-based computing clusters by providing instructions to a cloud computing service managing the cloud computing cluster, which in turns modifies the one or more cloud-based computing clusters.

As previously mentioned, conventional cloud management systems have a number of shortcomings in relation to accuracy, efficiency, and flexibility of operation. For example, some conventional cloud management systems utilize an auto-scaling model that provides inaccurate auto-scaling actions when the cloud-based computing cluster data and/or information is outside a reasonable decision (or confidence) interval of the auto-scaling model (and/or when more than one cloud service provider provides information). For example, such data and/or information can include random or unpredictable inbound load patterns (or profiles). Indeed, the auto-scaling model of the conventional cloud management systems can cause outages due to under-provisioning computing resources based on the inaccurate auto-scaling action. Some conventional cloud management systems aggressively scale (e.g., up or down) a computing cluster due to the inaccurate auto-scaling action. Accordingly, conventional cloud management systems can fail to accurately provision computing resources in a cloud-based computing system (e.g., when cloud-based computing cluster data is abnormal for an auto-scaling model).

Furthermore, as a result of inaccurate auto-scaling strategies, conventional cloud management systems can inefficiently utilize computing resources. As an example, some conventional cloud management systems inefficiently utilize significant computing resources and energy when aggressively increasing the available computing resources in situations where there is a low amount of data to process due to an inaccurate auto-scaling action. Moreover, some conventional cloud management systems may aggressively decrease the available computing resources in situations where there is a high amount of data to process. Furthermore, some conventional cloud management systems allow for outages and/or provision for a max computing load at all times in large, complex cloud computing systems (e.g., instead of using an inaccurate auto-scaling model due to the complexity of the cloud computing system). Such misguided scaling of computing resources by the conventional cloud management systems can lead to inefficiencies in computing resources, energy, and computing services (e.g., poor utilization of computing resources and energy, down-time in services, costs of service down-times, costs of over utilization of computing resources and energy, etc.).

Moreover, many conventional cloud management systems are rigid. In particular, conventional cloud management systems often cannot easily utilize auto-scaling on complex cloud-based computing systems. Indeed, although some conventional cloud management systems can use auto-scaling to account for some factors present in cloud-based computing, many conventional cloud management systems cannot easily make an auto-scaling decision that considers a broad range of varying factors present within a complex cloud-based computing system. In addition, conventional cloud management systems cannot easily account for computing resources of multiple cloud service providers in an auto-scaling decision without causing inaccuracies, inefficiencies, and/or inconsistencies amongst the computing resources of the multiple cloud service providers. For example, the provisioning and observing of computing resources within complex computing clusters may require detailed knowledge of the computing clusters and multiple cloud service providers may not have the ability to easily understand and/or manipulate (or modify) the complex computing clusters.

The digital dynamic auto-scaling system of one or more implementations of the present disclosure provides advantages and benefits over conventional systems and methods by determining an accurate and efficient auto-scaling action by weighing multiple proposed auto-scaling actions from multiple scaling models based on confidence scores. For instance, by utilizing multiple scaling models to determine an auto-scaling action to perform, the digital dynamic auto-scaling system can determine an accurate auto-scaling action for a broad range of factors present within a complex cloud-based computing system. In particular, the digital dynamic auto-scaling system can utilize a proposed auto-scaling action from a scaling model that is confident that the provided cloud-based computing information is within a reasonable decision interval of the scaling model compared to the other available scaling models. Indeed, by determining which proposed auto-scaling action to utilize based on confidence associated with each of the scaling models, the digital dynamic auto-scaling system can accurately provision (or allocate) computing resources regardless of abnormalities in the cloud-based computing information and/or a presence of multiple cloud service providers.

In addition to an improvement in accuracy, the digital dynamic auto-scaling system can also improve efficiency. For instance, by accurately provisioning (or allocating) computing resources within a cloud computing system (e.g., for one or more cloud-based computing clusters) by using multiple proposed auto-scaling action based on confidence, the digital dynamic auto-scaling system can more efficiently utilize computing resources compared to conventional cloud management systems. In particular, the digital dynamic auto-scaling system can avoid overly aggressive scaling and outages compared to conventional cloud management systems by utilizing a proposed auto-scaling action of a selected scaling model from multiple scaling models based on confidence scores indicating an accurate provisioning. Accordingly, the digital dynamic auto-scaling system can result in more efficient utilization of computing and energy resources and also less down-time of computing services in comparison to conventional cloud management systems.

Furthermore, the digital dynamic auto-scaling system can also improve flexibility of operation. For instance, the digital dynamic auto-scaling system can utilize auto-scaling to accurately and efficiently provision computing resources in a cloud-based computing cluster regardless of varying factors and/or circumstances that are present within a complex cloud-based computing system (i.e., the digital dynamic auto-scaling system can adapt to varying factors by using multiple scaling models based on confidence of the scaling models). Additionally, because the digital dynamic auto-scaling system can determine an accurate and efficient auto-scaling action regardless of varying factors that are present within a complex cloud-based computing system, the digital dynamic auto-scaling system can easily scale cloud-based computing clusters that utilize multiple cloud service providers. Furthermore, by acting as a layer that utilizes computing resources (or clusters) from multiple cloud service providers, the digital dynamic auto-scaling system has detailed knowledge of the computing clusters and, therefore, can more easily understand and/or manipulate (or modify) the complex computing clusters (e.g., having resources from multiple cloud service providers). Accordingly, the digital dynamic auto-scaling system can improve flexibility of operation relative to conventional cloud management systems.

As illustrated by the foregoing discussion, the present disclosure utilizes a variety of terms to describe features and advantages of the digital dynamic auto-scaling system. For example, an auto-scaling action can include one or more instructions that represent modifications (or adjustments) to perform in association with one or more computing resources (e.g., resources corresponding to cloud-based computing clusters). In particular, an auto-scaling action can include one or more configurations and/or parameters that instruct a computing cluster (or cloud-based service provider) to increase and/or decrease available computing resources and/or to change computing task assignments associated within the computing cluster. For instance, an auto-scaling action can include a command to implement a specific scaling strategy (e.g., increase and/or decrease computing resources available to a computing cluster using specific computer metric configurations for metrics such as CPU utilization, memory usage, network usage, number of active nodes or servers in a computing cluster).

Additionally, a scaling model (i.e., an auto-scaling model or an auto-scaling decision maker) can include a computer representation or algorithm that can determine an auto-scaling action based on various information associated with a computing cluster. In particular, a scaling model can include a scaling policy and/or an algorithm that outputs an auto-scaling action based on input information associated with a computing cluster. For instance, a scaling model can include a machine learning model (e.g., a neural network) that learns from and make predictions on input information associated with a computing cluster to generate outputs that reflect patterns and attributes from the information in order to determine an auto-scaling action (or outputs that reflect an auto-scaling action). In some embodiments, a scaling model can include, but is not limited to, a reactive scaling model, a predictive scaling model, and/or a reinforcement scaling model.

Moreover, a confidence score can include a value that represents the reliability and/or accuracy of a scaling action proposed by a scaling model. In particular, a confidence score can include a value determined by a scaling model that is associated with an auto-scaling action determined the scaling model to represent the reliability and/or accuracy of the determined auto-scaling action. For example, a confidence score can include a numerical value that indicates a degree of reliability and/or accuracy of an auto-scaling action proposed by a scaling model (e.g., a confidence in the proposed auto-scaling action). Indeed, a confidence score can use a numerical value that represents an increased degree of reliability and/or accuracy of an auto-scaling action as the numerical value increases.

Furthermore, a computing cluster (or a cloud-based computing cluster) can include one or more connected computers that work together to perform one or more computing tasks. Indeed, a computer cluster can include multiple nodes (e.g., that represent computing devices such as server devices) that are connected (e.g., via a network). The computer-cluster can include nodes that include hardware such as one or more central processing units (CPU), graphical processing units (GPU), random access memory (RAM), storage devices (e.g., hard disk drives, flash memory, etc.), networking devices, and/or any combination thereof. For instance, a computer-cluster can process, create, and/or store data to perform one or more computing tasks (e.g., collectively using multiple nodes of the computer-cluster and/or using specific nodes).

Additionally, a cloud-based computing cluster can include a computing cluster that is accessible via an internet connection (e.g., remotely via a network as described below) and/or performs one or more computing tasks for one or more cloud-based services. Moreover, a cloud-based service (or cloud service) can include one or more services and/or computing tasks performed via a cloud-based computing cluster. For example, a cloud-based service can include services (or tasks) such as, but not limited to, cloud-based data storage, cloud-based data processing, cloud-based digital graphics processing, cloud-based website hosting services, and/or cloud-based digital content streaming. Furthermore, a cloud-based service provider (i.e., a cloud service provider or cloud service vendor such as MICROSOFT AZURE, AMAZON WEB SERVICES or GOOGLE CLOUD PLATFORM) can include an entity that operates a cloud-based computing cluster that provides one or more cloud-based services.

Furthermore, a computing resource allocation can include a representation and/or configuration of how computing resources are provisioned across one or more computing clusters. For example, a computing resource allocation can include a setting corresponding to the quantity of computing resources allocated (or provisioned) within one or more computing clusters. Additionally, a computing resource can include, but is not limited to, a node (e.g., a server or other computing device) used within one or more computing clusters, computing hardware (e.g., CPUs, RAM, networking devices, and/or storage devices), and/or a software based configuration for an amount of CPU, RAM, network bandwidth, and/or storage space allotted (or made available) to a node or computing cluster.

Furthermore, a computer resource utilization can include a quantifiable configuration of how computing resources are utilized (e.g., settings for how many nodes, computing hardware, amount of CPU, RAM, network bandwidth, and/or storage space are allotted to perform a task and is allotted to computing cluster). Furthermore, a computing task can include a set of instructions that are performed using a computing cluster (or computing device). For example, a computing task can include, but is not limited to, storing a digital image file, processing a mathematical algorithm, converting a digital file format, indexing digital files, streaming digital content, modifying digital content, routing network packets, and/or facilitating digital communication.

Moreover, information associated with a computing cluster can include one or more data points that provide information about the past, present, and/or future state of a computing cluster. For example, information associated with a computing cluster can include metric information such as CPU utilization information, memory usage information, and/or network usage information. Furthermore, information associated with a computing cluster can include historical data recorded by a computing cluster, current data reported by a computing cluster, and/or predicted data of a computing cluster (e.g., a predicted requirement of computing resources, a predicted network load, etc.).

Turning now to the figures, FIG. 1 illustrates a schematic diagram of a system 100 in which a digital dynamic auto-scaling system 106 can operate in accordance with one or more embodiments. As illustrated in FIG. 1, the system 100 includes server device(s) 102, server device(s) 108, a cloud-based computing cluster 112, a network 118, and a client device 116. As further illustrated in FIG. 1, the one or more components of the system 100 can communicate with each other (e.g., via network 118 and/or directly).

As shown in FIG. 1, the server device(s) 102 can include a variety of types of computing devices, including those explained below with reference to FIG. 9. The server device(s) 102 can include a digital cloud management system 104 which further includes the digital dynamic auto-scaling system 106. The digital cloud management system 104 can store, process, modify, receive, utilize, manage, and/or provide a cloud-based computing cluster and/or one or more scaling models. For example, the digital cloud management system 104 can manage a cloud-based computing cluster by provisioning computing resources for the cloud-based computing cluster to perform one or more computing tasks. Furthermore, the digital cloud management system 104 can store, communicate with, and/or access one or more scaling models.

Furthermore, the digital dynamic auto-scaling system 106 can determine an auto-scaling action and modify a computing cluster based on the determined auto-scaling action (e.g., the cloud-based computing cluster 112). In particular, the digital dynamic auto-scaling system 106 (and/or the digital cloud management system 104) can determine an auto-scaling action to perform on the cloud-based computing cluster 112 by weighing multiple proposed auto-scaling actions (or strategies) from multiple scaling models (e.g., from the server device(s) 108) based on confidence scores associated with the proposed auto-scaling actions. In addition, the digital dynamic auto-scaling system 106 can modify the cloud-based computing cluster 112 (e.g., by modifying an allocation of computing resources belonging to the cloud-based computing cluster 112) using the determined auto-scaling action.

As shown in FIG. 1, the server devices(s) 108 include scaling models 110a-110n. Indeed, the server device(s) 108 can implement the scaling models 110a-110n and utilize the scaling models 110a-110n to determine multiple proposed auto-scaling actions for the digital dynamic auto-scaling system 106. For instance, the server device(s) 108 can receive information associated with the cloud-based computing cluster 112 from the digital dynamic auto-scaling system 106 and determine proposed auto-scaling actions and confidence scores to provide to the digital dynamic auto-scaling system 106. Indeed, the scaling models 110a-110n can include any combination of scaling models in accordance with one or more embodiments herein. Moreover, server device(s) 108 can include a variety of types of computing devices, including those explained below with reference to FIG. 9.

In one or more embodiments, the scaling models 110a-110n can be provided by a third-party source (e.g., a third-party API from a third-party source used by the digital dynamic auto-scaling system 106 implemented on the server device(s) 108). Although FIG. 1 illustrates the scaling models 110a-110n as part of the server device(s) 108, in one or more embodiments, the scaling models 110a-110n can be implemented within the server device(s) 102 (e.g., within the digital cloud management system 104). Furthermore, the scaling models 110a-110n can also be implemented in one or more server devices of one or more cloud service providers. For instance, the digital dynamic auto-scaling system 106 can access proposed auto-scaling actions from scaling models utilized by one or more cloud service providers (e.g., one or more cloud service providers corresponding to nodes 114a-114n in the cloud-based computing cluster 112).

Furthermore, as shown in FIG. 1, the cloud-based computing cluster 112 can include nodes 114a-114n. In some embodiments, the nodes 114a-114n can include computing devices operated (or managed) by the digital cloud management system 104. Indeed, the digital cloud management system 104 can utilize the nodes 114a-114n to perform one or more computing tasks (e.g., cloud-based services). As an example, the client device 116 can provide a service request to the cloud-based computing cluster 112 (or the digital cloud management system 104) and the digital cloud management system 104 can utilize the nodes 114a-114n to perform computing tasks associated with the service request. Additionally, the digital cloud management system 104 can modify one or more nodes of the cloud-based computing cluster 112 in accordance with one or more embodiments herein (e.g., provision more or less computing resources, add or remove nodes, provide or remove tasks to/from one or more nodes) based on a determined auto-scaling action. Furthermore, the cloud-based computing cluster 112 and/or the nodes 114a-114n can include a variety of types of computing devices, including those explained below with reference to FIG. 9.

In some embodiments, the digital dynamic auto-scaling system 106 can utilize the cloud-based computing cluster 112 to configure (or provision) one or more nodes based on a determined auto-scaling action prior to providing instructions to one or more cloud service providers to implement the scaling configuration of the one or more nodes in the cloud-based computing cluster 112. For example, the cloud-based computing cluster 112 can act as a schematic enabled to send auto-scaling instructions to one or more cloud service providers operating the nodes 114a-114n within the cloud-based computing cluster 112. Furthermore, in some embodiments, the nodes 114a-114n can belong to one or more separate cloud service providers. Indeed, one or more nodes from the nodes 114a-114n can be operated (or managed) be different cloud service providers. In one or more embodiments, the digital dynamic auto-scaling system 106 can utilize APIs for pluggability into the one or more separate cloud service providers (e.g., within the cloud-based computing cluster 112) and/or into the one or more scaling models (e.g., within the server device(s) 108).

Additionally, as shown in FIG. 1, the system 100 includes the client device 116. In one or more embodiments, the client device 116 may include, but is not limited to, a mobile device (e.g., a smartphone, tablet), a laptop, a desktop, or another type of computing device as described below with reference to FIG. 9. The client device 116 can provide information (e.g., browsing data, geographic data, e-commerce data, etc.) and other digital content (e.g., digital images, digital videos, electronic documents, etc.) to the cloud-based computing cluster 112 and/or the server device(s) 102. Furthermore, the client device 116 can provide a service request (e.g., to process data, store data, etc.) to the cloud-based computing cluster 112 and/or the server device(s) 102 in order to cause the nodes 114a-114n perform the service request. Although FIG. 1 illustrates a single client device 116, the system 100 can include any number of client devices (e.g., thousands, millions) communicating with the cloud-based computing cluster 112 and/or the server device(s) 102.

Additionally, as shown in FIG. 1, the system 100 includes the network 118. As mentioned above, the network 118 can enable communication between components of the system 100. In one or more embodiments, the network 118 may include the Internet or World Wide Web. Additionally, the network 118 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 102, the server device(s) 108, the cloud-based computing cluster 112, the client device 116, and the network 118 may communicate using any communication platforms and technologies suitable for transporting data and/or communication signals, including any known communication technologies, devices, media, and protocols supportive of data communications, examples of which are described with reference to FIG. 9.

Furthermore, although FIG. 1 illustrates the server device(s) 102 directly communicating with the server device(s) 108 and the cloud-based computing cluster 112, the server device(s) 102 can communicate with the server device(s) 108 and/or the cloud-based computing cluster 112 via the network 118. Furthermore, although FIG. 1 illustrates the cloud-based computing cluster 112 and the client device 116 communicating via the network 118, the cloud-based computing cluster 112 and the client device 116 can communicate directly. Indeed, the various components of the system 100 can communicate and/or interact via various other methods (e.g., the server device(s) 102 and the client device 116 can communicate directly and/or via the network 118).

Indeed, as mentioned above, the digital dynamic auto-scaling system 106 can determine an auto-scaling action to perform using proposed auto-scaling actions from multiple scaling models based on confidence. As an example, in reference to FIG. 1, the digital dynamic auto-scaling system 106 can query the scaling models 110a-110n for proposed auto-scaling actions with confidence scores. Then, the digital dynamic auto-scaling system 106 can determine an auto-scaling action to perform by weighing the proposed auto-scaling actions based on the confidence scores. Upon determining the auto-scaling action to perform, the digital dynamic auto-scaling system 106 can modify the cloud-based computing cluster 112 by modifying (or preparing) the cloud-based computing cluster 112 to be scaled (e.g., configuring one or more computing resource allocations associated with the cloud-based computing cluster 112).

Furthermore, the digital dynamic auto-scaling system 106 can utilize the modified cloud-based computing cluster 112 to instruct one or more cloud service providers (e.g., one or more scaler implementations) to modify computing resource allocations in accordance with the cloud-based computing cluster 112 (e.g., increase or decrease a number of nodes associated with the one or more cloud service providers). Indeed, in one or more embodiments the digital dynamic auto-scaling system 106 can wait for the one or more cloud-based computing clusters to converge (e.g., the cluster size to converge) prior to instructing the one or more cloud service providers to modify computing resource allocations with the cloud-based computing cluster 112.

In addition, although FIG. 1 illustrates the digital dynamic auto-scaling system 106 being implemented by a particular component and/or device (e.g., server device(s) 102) within the system 100, the digital dynamic auto-scaling system 106 (and/or the digital cloud management system 104) can be implemented, in whole or in part, by other computing devices and/or components in the system 100. Furthermore, the cloud-based computing cluster 112 and the server device(s) 108 can also be implemented in whole or in part, by other computing devices and/or components in the system 100. For example, the scaling models 110a-110n and/or the cloud-based computing cluster can be implemented in whole, or in part, by the server device(s) 102. Moreover, the system 100 can include any number of scaling models, server devices, cloud-based computing clusters, nodes, and/or client devices.

Figure 2:
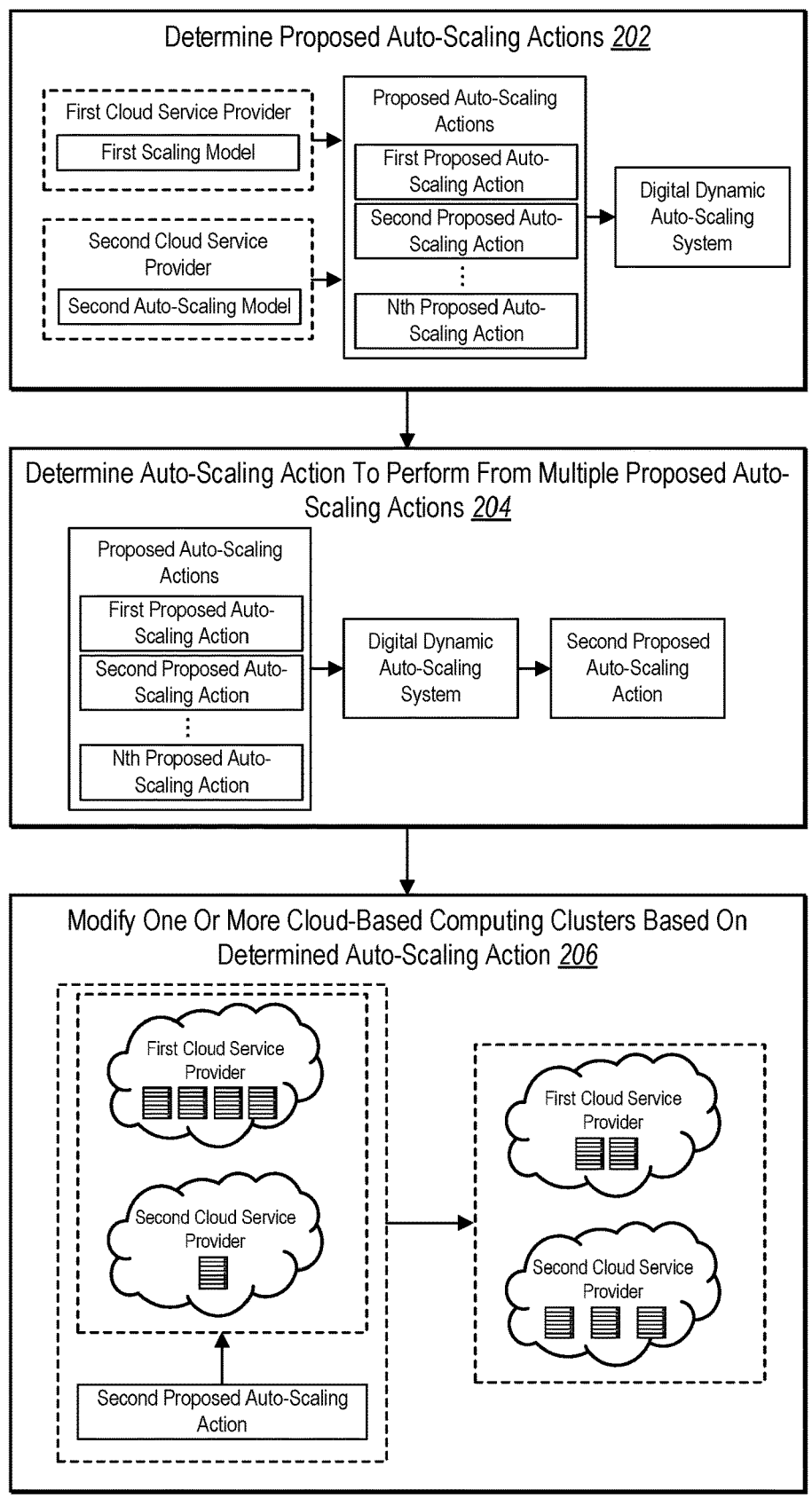
FIG. 2 illustrates an overview of a process of a digital dynamic auto-scaling system determining an auto-scaling action and modifying a computing cluster using the determined auto-scaling action in accordance with one or more embodiments.

As mentioned above, the digital dynamic auto-scaling system 106 can determine an auto-scaling action based on multiple proposed auto-scaling actions from multiple scaling models. For example, FIG. 2 illustrates an overview of a process of the digital dynamic auto-scaling system 106 determining an auto-scaling action to perform in accordance with one or more embodiments herein. In particular, FIG. 2 illustrates a flowchart of the digital dynamic auto-scaling system 106 determining proposed auto-scaling actions, utilizing the proposed auto-scaling actions to determine an auto-scaling action to perform, and modifying one or more cloud-based computing clusters based on the determined auto-scaling action.

For instance, as illustrated in FIG. 2, the digital dynamic auto-scaling system 106 performs an act 202 of determining proposed auto-scaling actions. For example, at predetermined intervals or in response to a trigger, the digital dynamic auto-scaling system 106 can send a query to each of the scaling models (e.g., via an application programing interface (API)) for a recommendation about how to scale the cloud-based computing cluster. In particular, the digital dynamic auto-scaling system 106 can sleep for a predetermined amount of time and upon waking can send the query requests to the scaling models. Alternatively, the cloud service providers can monitor performance metrics and send an alert or trigger in response to a change in a performance metric. In response to the alert, the digital dynamic auto-scaling system 106 can send the query requests to the scaling models.

The digital dynamic auto-scaling system 106 can receive proposed auto-scaling actions from one or more scaling models (e.g., scaling models that analyze and/or utilize information associated with a cloud-based computing cluster). For instance, the digital dynamic auto-scaling system 106 can utilize scaling models that are implemented within the digital dynamic auto-scaling system 106 and/or implemented by a third party source such as a cloud service provider. Thus, as shown in FIG. 2, the digital dynamic auto-scaling system 106 receives proposed auto-scaling actions (e.g., a first proposed auto-scaling action, a second proposed auto-scaling action, . . . , an Nth proposed auto-scaling action) from scaling models. Indeed, the dynamic auto-scaling system 106 can send the query requests to the scaling models in parallel (e.g., to receive proposed auto scaling actions all at once) and/or send the query requests in series (e.g., to receive proposed auto scaling actions one at a time). Additional detail regarding the digital dynamic auto-scaling system 106 determining proposed auto-scaling actions is provided below (e.g., in relation to FIG. 3).

Moreover, as shown in FIG. 2, the digital dynamic auto-scaling system 106 performs an act 204 of determining an auto-scaling action to perform from multiple proposed auto-scaling actions. In particular, the digital dynamic auto-scaling system 106 compares (or weighs) the proposed auto-scaling actions to determine the most reliable and/or accurate proposed auto-scaling action for the information associated with the computing cluster (e.g., using confidence scores). Indeed, the digital dynamic auto-scaling system 106 can select the most reliable proposed auto-scaling action from the multiple proposed auto-scaling actions as the auto-scaling action to perform. For example, as illustrated in FIG. 2, the digital dynamic auto-scaling system 106 identifies the second proposed auto-scaling action as the most reliable and selects the action as the auto-scaling action to perform. In some embodiments, the digital dynamic auto-scaling system 106 can utilize a fallback (or backup) auto-scaling action (e.g., based on a preferred scaling model) when each of the proposed auto-scaling actions fail to meet a threshold reliability and/or accuracy requirement. Additional detail regarding determining an auto-scaling action to perform from multiple proposed auto-scaling actions is provided below (e.g., in relation to FIG. 4).

Furthermore, as illustrated in FIG. 2, the digital dynamic auto-scaling system 106 performs an act 206 of modifying one or more cloud-based computing clusters based on a determined auto-scaling action. In particular, the digital dynamic auto-scaling system 106 can utilize a determined auto-scaling action to modify a computing resource allocation associated with a cloud-based computing cluster (e.g., using a strategy or configuration of the auto-scaling action). Indeed, the digital dynamic auto-scaling system 106 can change an allocation of computing resources within a cloud-based computing cluster (or one or more sets of computing resources belonging to multiple cloud service providers) using the auto-scaling action. More specifically, in one or more embodiments, the digital dynamic auto-scaling system 106 can instruct one or more of the cloud service providers to perform the determined scaling action. For example, the digital dynamic auto-scaling system 106 can make an API call to increase or reduce the number of nodes in a cluster in the cloud-based computing cluster.

As an example, FIG. 2 illustrates the digital dynamic auto-scaling system 106 modifying computing clusters by decreasing nodes in a computing cluster of the first cloud service provider and increasing nodes in a computing cluster of the second cloud service provider using the second proposed auto-scaling action. Additional detail regarding the digital dynamic auto-scaling system 106 modifying one or more cloud-based computing clusters based on a determined auto-scaling action to perform is provided below (e.g., in relation to FIGS. 5 and 6).

Figure 3:
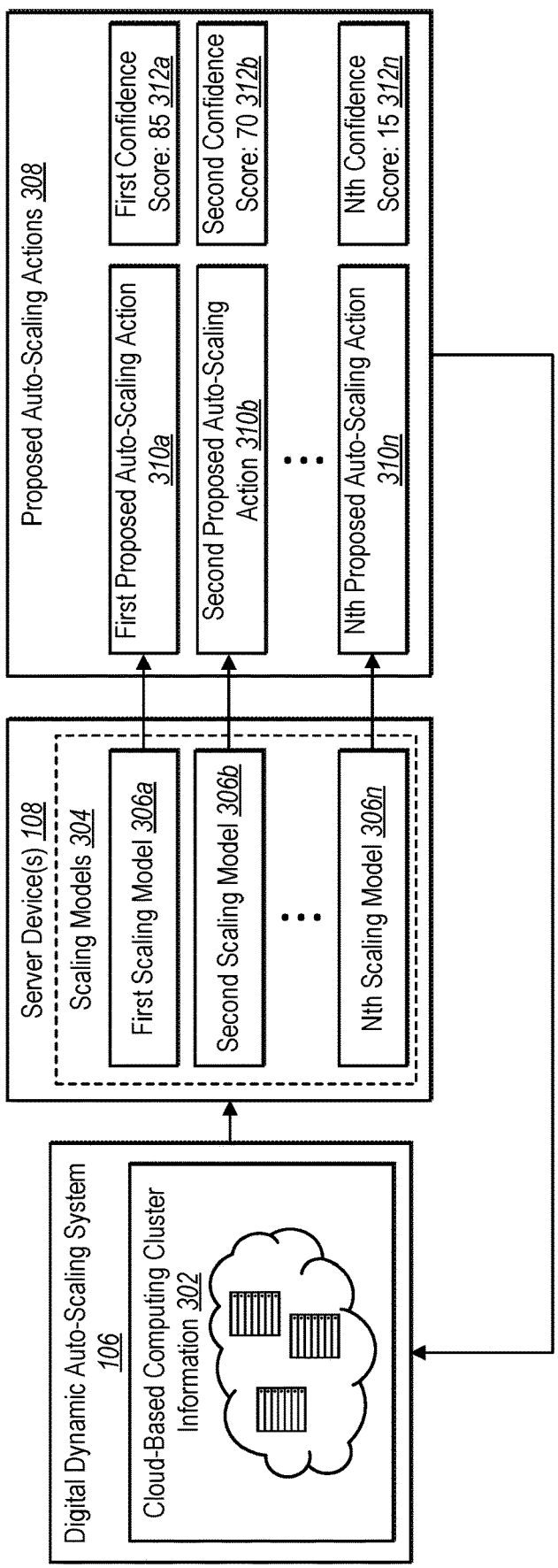
FIG. 3 illustrates a schematic diagram of the digital dynamic auto-scaling system determining proposed auto-scaling actions from multiple scaling models in accordance with one or more embodiments.

As mentioned above, the digital dynamic auto-scaling system 106 can determine proposed auto-scaling actions using multiple scaling models. For instance, FIG. 3 illustrates the multiple scaling models determining proposed auto-scaling actions. For instance, as shown in FIG. 3, the scaling models 304 can access cloud-based computing cluster information 302. In particular, as illustrated in FIG. 3, a first scaling model 306a, a second scaling model 306b, and an Nth scaling model 306n on the server device(s) 108 can each access cloud-based computing cluster information 302.

Furthermore, as illustrated in FIG. 3, the first scaling model 306a, the second scaling model 306b, and the Nth scaling model 306n analyze the cloud-based computing cluster information 302 to determine (or generate) proposed auto-scaling actions 308. In particular, as illustrated in FIG. 3, the first scaling model 306a determines a first proposed auto-scaling action 310a and a first confidence score 312a (e.g., a score of 85), the second scaling model 306b determines a second proposed auto-scaling action 310b and a second confidence score 312b (e.g., a score of 70), and the Nth scaling model 306n determines an Nth proposed auto-scaling action 310n and an Nth confidence score 312n (e.g., a score of 15). Then the server device(s) 108 can send the proposed auto-scaling actions 308 (and associated confidence scores) to the digital dynamic auto-scaling system 106.

In one or more embodiments, the scaling models 304 can receive (or utilize) various information associated with one or more cloud-based computing clusters (e.g., information provided by the digital dynamic auto-scaling system 106). In particular, the information can include metric information of the one or more cloud-based computing clusters and/or of one or more nodes belonging to the computing clusters (e.g., information regarding CPU usage, memory or RAM usage, storage usage, and/or network usage). For example, the scaling models 304 can utilize information such as the number of CPUs operating on a cloud-based computing cluster (as the CPU usage information). Additionally, the scaling models 304 can utilize information such as the number of CPU threads, the CPU clock frequency, and/or CPU idle time for one or more CPUs utilized by the one or more cloud-based computing clusters (as the CPU usage information).

Furthermore, the scaling models 304 can utilize information such as a total amount of RAM and/or memory available and/or utilized on the cloud-based computing clusters (as the memory or RAM usage information). In some embodiments, the scaling models 304 can utilize information such as RAM speed and/or RAM bandwidth for one or more RAM units utilized by the one or more cloud-based computing clusters (as the memory or RAM usage information). Additionally, the scaling models 304 can utilize information such as the amount of available storage accessible on the one or more cloud-based computing clusters (as the storage usage information). In addition, the scaling models 304 can utilize information such as the read and/or write speed of one or more storage devices available on the one or more cloud-based computing clusters (as the storage usage information). Moreover, the scaling models 304 can utilize information such as used bandwidth, available bandwidth, latency, download speed, and/or upload speed associated with one or more network devices of the one or more cloud-based computing clusters (as the network usage information).

Additionally, in some embodiments, the scaling models 304 can utilize information corresponding to a network load and/or incoming network load. Indeed, the scaling models 304 can utilize information such as a number of client devices attempting to utilize (or connect to) the one or more cloud-based computing clusters. Moreover, the scaling models 304 can utilize information such as a number of service requests (and/or a complexity of the service requests) that are being sent by one or more client devices to the one or more cloud-based computing clusters.

In some embodiments, the scaling models 304 can utilize information corresponding to circumstances and/or events related to the one or more cloud-based computing clusters. For example, the scaling models 304 can utilize information such as a time of day, scheduled events (e.g., a mass upload/download, a batch process, server maintenance, expected weather outages, etc.). Additionally, the scaling models 304 can utilize information corresponding to scheduled events (e.g., holidays, sale events, major video streaming events, digital content releases, etc.).

Indeed, any variety of information (as described above) can be collected and/or determined by the digital cloud management system 104 (or the digital dynamic auto-scaling system 106) for the one or more cloud-based computing clusters. Additionally, in some embodiments, the digital dynamic auto-scaling system 106 can receive such information associated with the one or more cloud-based computing clusters from one or more cloud service providers operating computing resources belonging to the one or more cloud-based computing clusters. In some embodiments, the digital dynamic auto-scaling system 106 can utilize a third party source for a variety of information described above (e.g., information for scheduled events).

Indeed, the scaling models 304 can utilize any information associated with one or more cloud-based computing clusters that is current (e.g., from a present time or near present time). In some embodiments, the scaling models 304 can utilize historical data for any of the information (described above) that is associated with the one or more cloud-based computing clusters. As an example, the scaling models 304 can utilize historical information for CPU usage, RAM usage, storage usage, and/or network usage (e.g., usage of such computing resources at the same time last year, last week, last month, etc.). Indeed, the digital dynamic auto-scaling system 106 can provide historical data for any of the information described above as the information associated with the one or more cloud-based computing clusters to the scaling models 304. In one or more embodiments, the scaling models 304 can utilize predicted information for any of the information types described above (e.g., a predicted computing resource usage and/or increased network load for a future time).

Furthermore, as shown in FIG. 3, the digital dynamic auto-scaling system 106 utilizes multiple scaling models to determine multiple proposed auto-scaling actions. In particular, the digital dynamic auto-scaling system 106 can utilize any variety and/or combination of scaling models. As an example, the digital dynamic auto-scaling system 106 can utilize scaling models such as, but not limited to, a reactive auto-scaling model, a predictive (or forecast) auto-scaling model, or a reinforcement auto-scaling model. Indeed, in one or more embodiments, the scaling models utilized by the digital dynamic auto-scaling system 106 can be independent (e.g., an independent agent that operates independent of other scaling models).

For example, the digital dynamic auto-scaling system 106 can utilize a reactive auto-scaling model that reacts to current information associated with the one or more cloud-based computing clusters. Indeed, the reactive auto-scaling model can handle unknown situations with greater confidence by responding to the current information associated with the one or more cloud-based computing clusters (e.g., detailed metrics the one or more computing cluster provide at that current time). In some embodiments, the reactive auto-scaling model utilizes a low mark (e.g., a lower threshold) for computing resource reservations (e.g., how much computing resources a cloud-based computing cluster may utilize) across the one or more cloud-based computing clusters. Indeed, whenever the reactive auto-scaling model detects a breach in the computing resource reservations (e.g., based on any information associated with the one or more cloud-based computing clusters described above), the reactive auto-scaling model proposes an auto-scaling action to increase the number of nodes available on the one or more cloud-based computing clusters. Moreover, the reactive auto-scaling model can also track the number of nodes that become idle in the one or more cloud-based computing clusters and, in response, propose an auto-scaling action to remove such nodes from the cloud-based computing clusters.

Furthermore, the digital dynamic auto-scaling system 106 can utilize a predictive auto-scaling model that utilizes time based information (e.g., daily, weekly and yearly seasonality) to determine a forecast of how much load will be on the one or more cloud-based computing clusters at a given time. Indeed, the predictive auto-scaling model can utilize any of the information described above to determine a forecasted load on the one or more cloud-based computing clusters. Indeed, the predictive auto-scaling model can utilize such information to infer the number of nodes that will be utilized in the future on the one or more cloud-based computing clusters.

Additionally, the digital dynamic auto-scaling system 106 can also utilize a reinforcement auto-scaling model that can optimize the cost of operating the one or more cloud-based computing clusters. For instance, the reinforcement auto-scaling model can analyze the current load and historical trends (e.g., historical data as described above) to determine an auto-scaling action. In particular, the reinforcement auto-scaling model can determine an auto-scaling action to modify the one or more cloud-based computing clusters to match the necessary amount of computing resources to operate a current load based on historical trends. Indeed, this enables the reinforcement auto-scaling model to optimize the one or more cloud-based computing clusters to utilize no more computing resources than possibly needed based on historical trends.

Furthermore, as mentioned above, the digital dynamic auto-scaling system 106 can utilize a scaling model to determine a proposed auto-scaling action. In particular, the digital dynamic auto-scaling system 106 can determine (or receive) proposed auto-scaling actions that provide a variety of instructions, commands, and/or other information to scale the one or more cloud-based computing clusters. For example, the digital dynamic auto-scaling system 106 can determine a proposed auto-scaling action using a scaling model that includes modifications to computing resource allocations (e.g., within a cloud-based computing cluster, a computing cluster that is specific to a cloud service provider, and/or between computing clusters of cloud service providers). Additionally, the digital dynamic auto-scaling system 106 can determine a proposed auto-scaling action using a scaling model that includes modifications to computing resource utilization on a computing cluster. Moreover, the digital dynamic auto-scaling system 106 can determine modifications in computing task allocations (e.g., a number of computing tasks provided to a computing cluster and/or a complexity of the computing tasks). Indeed, such instructions, commands, and/or other information to scale the one or more cloud-based computing clusters is described below (e.g., in relation to FIGS. 5 and 6).

Furthermore, the digital dynamic auto-scaling system 106 (or a scaling model) can determine a confidence score associated with a proposed auto-scaling action. As mentioned above, the digital dynamic auto-scaling system 106 can utilize a confidence score to measure a reliability and/or accuracy of an auto-scaling action proposed by a scaling model. Indeed, the digital dynamic auto-scaling system 106 can associate the confidence score with a proposed auto-scaling action and/or with a scaling model that proposes an auto-scaling action. Furthermore, the digital dynamic auto-scaling system 106 (or scaling model) can determine a confidence score using a variety of methods and/or factors.

As an example, the digital dynamic auto-scaling system 106 can receive a confidence score from a scaling model. In particular, the digital dynamic auto-scaling system 106 can receive a confidence score that is determined by a scaling model based on data (or knowledge) of previously proposed auto-scaling actions for information that is similar to currently analyzed information associated with one or more cloud-based computing clusters. Indeed, the data of the previously proposed auto-scaling actions can include a success rate corresponding to the previously proposed auto-scaling actions for situations similar to the currently analyzed information associated with one or more cloud-based computing clusters. As an example, the digital dynamic auto-scaling system 106 can receive a confidence score from a scaling model that determines the confidence score based on a success rate that includes reported auto-scaling failures (e.g., inaccurately over provisioning computing resources in similar situations, outages caused by under provisioning computing resources in similar situations, etc.). Furthermore, the digital dynamic auto-scaling system 106 can receive such confidence scores from one or more scaling models that determine the confidence scores using the same and/or different metrics and/or factors per scaling model.

In one or more embodiments, the digital dynamic auto-scaling system 106 can determine a confidence score for a scaling model and/or proposed auto-scaling action. In particular, the digital dynamic auto-scaling system 106 can utilize historical data corresponding to a specific scaling model and/or proposed auto-scaling action for a situation similar to a current situation of one or more cloud-based computing clusters as indicated by information associated with the one or more cloud-based computing clusters. Indeed, the digital dynamic auto-scaling system 106 can utilize historical data such as a success rate of the specific scaling model and/or proposed auto-scaling action in a similar situation. Moreover, the digital dynamic auto-scaling system 106 can assign a confidence score using the process described above for more than one scaling model (e.g., based on information specific to each scaling model). Additionally, the digital dynamic auto-scaling system 106 can determine a confidence score for the one or more scaling models using the same and/or different metrics and/or factors per scaling model.

Figure 4:
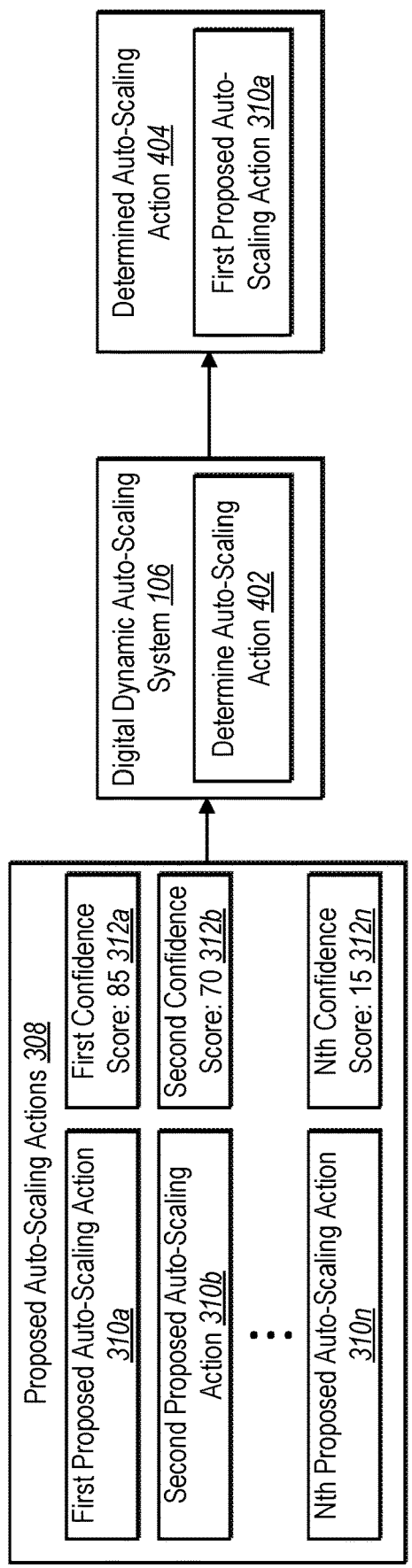
FIG. 4 illustrates a schematic diagram of the digital dynamic auto-scaling system determining an auto-scaling action to perform from proposed auto-scaling actions in accordance with one or more embodiments.

As previously mentioned, the digital dynamic auto-scaling system 106 can determine an auto-scaling action to perform based on multiple proposed auto-scaling actions from multiple scaling using confidence scores. For example, FIG. 4 illustrates the digital dynamic auto-scaling system 106 determining an auto-scaling action to perform by weighing multiple proposed auto-scaling actions from multiple scaling models based on confidence scores. Indeed, by doing so, the digital dynamic auto-scaling system 106 can accurately and efficiently scale one or more cloud-based computing clusters regardless of cluster complexity, the number of cloud service providers present in a cluster, differing strategies between multiple cloud service providers, and/or regardless of a current circumstance of the one or more cloud-based computing clusters.

For instance, as shown in FIG. 4, the digital dynamic auto-scaling system 106 determines an auto-scaling action in an act 402 from the proposed auto-scaling actions 308 (e.g., the first proposed auto-scaling action 310*a* and the first confidence score 312*a*, the second proposed auto-scaling action 310*b* and the second confidence score 312*b*, and the Nth proposed auto-scaling action 310*n* and the Nth confidence score 312*n*). Indeed, as illustrated in FIG. 4, the digital dynamic auto-scaling system 106 determines (e.g., in the act 402) that the first proposed auto-scaling action 310*a* corresponds to the highest confidence score (e.g., the first confidence score 312*a* of 85). As such, as shown in FIG. 4, the digital dynamic auto-scaling system 106 utilizes the first proposed auto-scaling action 310*a* as a determined auto-scaling action 404.

As just mentioned, the digital dynamic auto-scaling system 106 can determine (or select) an auto-scaling action to perform based on confidence scores. For example, the digital dynamic auto-scaling system 106 can compare confidence scores corresponding to proposed auto-scaling actions (e.g., confidence scores for proposed auto-scaling actions as described above) to select a proposed auto-scaling action from the proposed auto-scaling actions as an auto-scaling action to perform. In one or more embodiments, the digital dynamic auto-scaling system 106 can compare the confidence scores to identify a highest confidence score (e.g., the confidence score that corresponds to the greatest value) and select a proposed auto-scaling action corresponding to the highest confidence score as an auto-scaling action to perform. Although, one or more embodiments herein illustrate the digital dynamic auto-scaling system 106 utilizing a highest confidence score, the digital dynamic auto-scaling system 106 can utilize other selection criteria based on the confidence score (e.g., select a proposed auto-scaling action corresponding to a lowest confidence score when confidence scores are measured to have a higher reliability and/or accuracy when a confidence score value is lower).

In some embodiments, the digital dynamic auto-scaling system 106 can compare confidence scores corresponding to proposed auto-scaling actions to a threshold confidence score to select a proposed auto-scaling action from the proposed auto-scaling actions as an auto-scaling action to perform. For instance, the digital dynamic auto-scaling system 106 can select a proposed auto-scaling action (as the auto-scaling action to perform) when a confidence score corresponding to the proposed auto-scaling action meets a threshold confidence score (e.g., is greater than and/or equal to the threshold confidence score). Moreover, in one or more embodiments, the digital dynamic auto-scaling system 106 can also select a proposed auto-scaling action when a confidence score meets a threshold confidence score by being less than and/or equal to the threshold confidence score (e.g., when confidence scores are measured to have a higher reliability and/or accuracy when a confidence score value is lower). Indeed, the digital dynamic auto-scaling system 106 can determine a threshold confidence score by receiving a threshold confidence score from an administrator of the digital cloud management system 104 and/or one or more cloud-based service providers.

Additionally, the digital dynamic auto-scaling system 106 can also select a proposed auto-scaling action when more than one confidence scores corresponding to proposed auto-scaling actions meet a threshold confidence score. For example, the digital dynamic auto-scaling system 106 can select between multiple proposed auto-scaling actions that correspond to confidence scores that meet a threshold confidence score based on preferences and/or other factors. In particular, the digital dynamic auto-scaling system 106 can select between the multiple proposed auto-scaling actions that have confidence scores that meet a threshold confidence score using preferences (e.g., set and/or configured by an administrator of the digital cloud management system 104) such as, but not limited to, a priority list of which scaling model to utilize when more than one proposed auto-scaling actions have confidence scores that meet the threshold confidence score. Furthermore, the digital dynamic auto-scaling system 106 can utilize other factors to select between proposed auto-scaling actions that meet a threshold confidence score such as, but not limited to, time of day, scheduled events, general historical success rate of scaling models, etc.

Furthermore, in one or more embodiments, the digital dynamic auto-scaling system 106 can utilize a backup scaling model (or auto-scaling action). In particular, the digital dynamic auto-scaling system 106 (or administrator of the digital dynamic auto-scaling system 106) can set a scaling model as the default scaling model to utilize when confidence scores of proposed auto-scaling actions fail to meet (or satisfy) a threshold confidence score. As an example, while determining a highest confidence score, the digital dynamic auto-scaling system 106 can determine that each of the confidence scores corresponding to the proposed auto-scaling actions fail to meet a threshold confidence score. Then, the digital dynamic auto-scaling system 106 can utilize a default scaling model to determine an auto-scaling action to perform (e.g., receive and utilize a proposed auto-scaling action from the default scaling model). In some embodiments, the digital dynamic auto-scaling system 106 utilizes the reactive auto-scaling model as the default scaling model. Although, the digital dynamic auto-scaling system 106 can utilize any scaling model as the default scaling model based on administrator preferences and/or other factors (e.g., preferences and/or factors as described above).

As mentioned above, the digital dynamic auto-scaling system 106 can modify one or more cloud-based computing clusters using a determined auto-scaling action. In particular, the digital dynamic auto-scaling system 106 can implement an auto-scaling action on the one or more cloud-based computing clusters to modify a computing resource allocation, computing resource utilization, and/or computing task allocation associated with the one or more cloud-based computing clusters. As mentioned above, by weighing multiple proposed auto-scaling actions from multiple scaling models based on confidence scores to determine an auto-scaling action for modifying the one or more cloud-based computing clusters, the digital dynamic auto-scaling system 106 can efficiently, accurately, easily provision computing resources and/or tasks for the one or more cloud-based computing clusters regardless of abnormalities in the cloud-based computing information and/or a presence of multiple cloud service providers.

Figure 5:
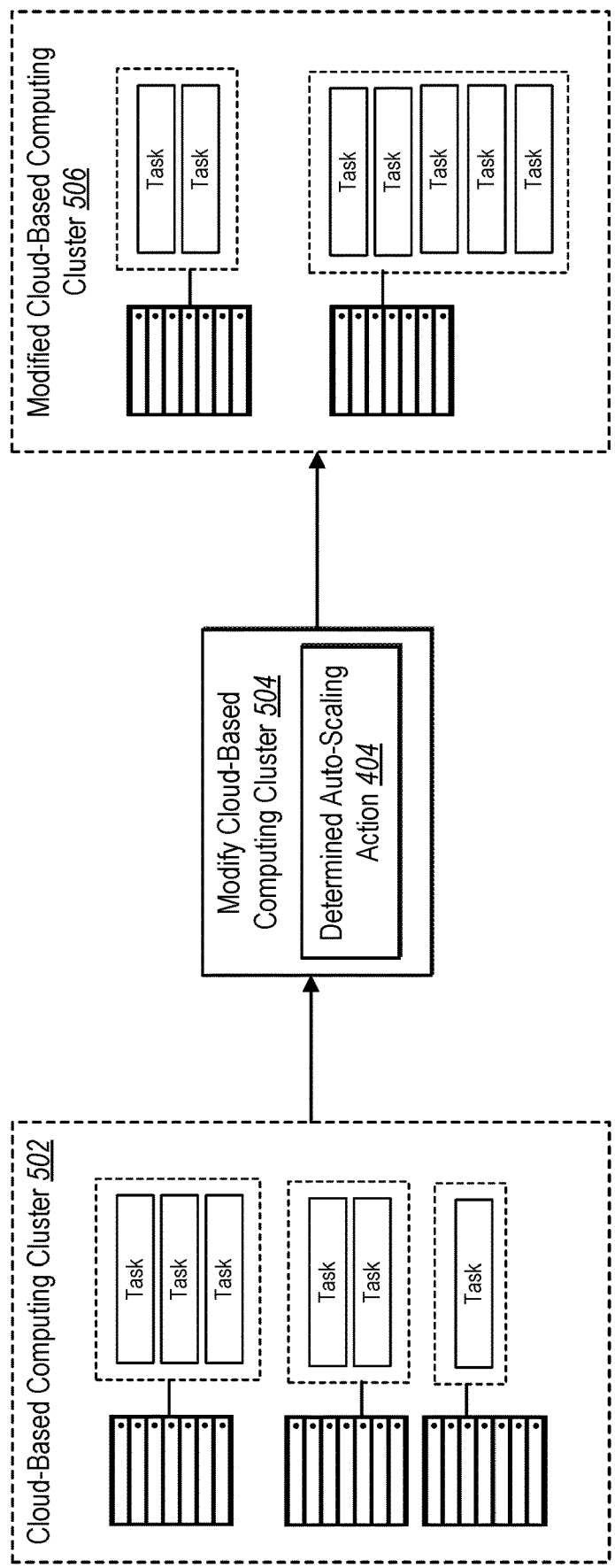
FIG. 5 illustrates a schematic diagram of the digital dynamic auto-scaling system modifying a computing cluster using a determined auto-scaling action in accordance with one or more embodiments.

As an example, FIG. 5 illustrates the digital dynamic auto-scaling system 106 modifying a cloud-based computing cluster using a determined auto-scaling action (e.g., an auto-scaling action determined in accordance with one or more embodiments herein). As illustrated in FIG. 5, the digital dynamic auto-scaling system 106 can modify a cloud-based computing cluster 502. Indeed, as shown in FIG. 5, the cloud-based computing cluster 502 includes nodes (e.g., represented as server device hardware) and a varying number of tasks (e.g., computing tasks) assigned to each of the nodes. The digital dynamic auto-scaling system 106, as shown in FIG. 5, modifies the cloud-based computing cluster in an act 504 using the determined auto-scaling action 404. Indeed, as illustrated in FIG. 5, the digital dynamic auto-scaling system 106 modifies the cloud-based computing cluster in the act 504 to create (or generate) a modified cloud-based computing cluster 506. In particular, as shown in FIG. 5, the digital dynamic auto-scaling system 106 decreases the number of nodes within the cloud-based computing cluster 502 and assigns additional tasks to a node based on the determined auto-scaling action 404 to create a modified cloud-based computing cluster 506. More particularly, the digital dynamic auto-scaling system 106 can send an API call to one or more cloud service providers to decrease the number of nodes within the cloud-based computing cluster 502 and assign additional tasks to a node based on the determined auto-scaling action 404 to create a modified cloud-based computing cluster 506.

As mentioned earlier, a cloud-based computing cluster can include a representation of one or more connected computers (or computing devices) that work together to perform one or more tasks. In particular, the digital dynamic auto-scaling system 106 can utilize a cloud-based computing cluster that includes one or more nodes that represent computing devices (e.g., server devices, storage devices, and/or other computing hardware). Furthermore, the digital dynamic auto-scaling system 106 can utilize a cloud-based computing cluster that includes computing task assignments to the one or more nodes (e.g., each node may have one or more computing tasks linked to the nodes). Additionally, the digital dynamic auto-scaling system 106 can utilize a cloud-based computing cluster to, but is not limited to, allocate computing resources (e.g., number of nodes available to the computing cluster), allocate computing resource utilization (e.g., computing resource utilization available to one or more nodes), and/or allocate computing tasks (e.g., add and/or remove computing tasks from one or more nodes). Indeed, in one or more embodiments, the digital dynamic auto-scaling system 106 can provide the cloud-based computing cluster (e.g., as a representation and/or instruction) to one or more cloud-based service providers (or computing resources available to the digital dynamic auto-scaling system 106) to configure computing resources according to the cloud-based computing cluster.

In one or more embodiments, the digital dynamic auto-scaling system 106 can utilize a determined auto-scaling action that includes instructions on scaling computing clusters (or systems). Indeed, the digital dynamic auto-scaling system 106 can utilize the determined auto-scaling action to modify the one or more cloud-based computing clusters (or computing clusters). For instance, as previously mentioned, the digital dynamic auto-scaling system 106 can utilize a determined auto-scaling action that includes instructions to modify one or more cloud-based computing clusters by allocating computing resources within the one or more computing clusters, allocating computing resource utilization within the one or more computing clusters, and/or allocating computing tasks within the one or more computing clusters. Indeed, the digital dynamic auto-scaling system 106 can modify a cloud-based computing cluster using any combination of modifications described in accordance with one or more embodiments herein.

As an example, the digital dynamic auto-scaling system 106 can modify one or more cloud-based computing clusters by modifying a computing resource allocation based on a determined auto-scaling action. In particular, the digital dynamic auto-scaling system 106 can modify (or change) a number of nodes present (or active) within a cloud-based computing cluster (e.g., increase and/or decrease the number of nodes available in the cloud-based computing cluster). Indeed, as mentioned above, the nodes can represent computing hardware available within the cloud-based computing cluster. Moreover, the digital dynamic auto-scaling system 106 can modify (or change) the number of nodes present in the cloud-based computing cluster by any amount specified in the determined auto-scaling action (e.g., increase or decrease by the specific amount and/or maintain the status quo). Furthermore, the digital dynamic auto-scaling system 106 can modify (or change) a number of nodes present (or active) within a cloud-based computing cluster for any variety of computing resources (or hardware) represented by the nodes (e.g., server devices, storage devices, network devices, etc.).

Additionally, as another example, the digital dynamic auto-scaling system 106 can modify one or more cloud-based computing clusters by modifying a computing resource utilization within the one or more cloud-based computing clusters. For example, the digital dynamic auto-scaling system 106 can modify (or change) computing resource metrics associated with (or available) within a cloud-based computing cluster (and/or individual nodes of the cloud-based computing cluster). For instance, the digital dynamic auto-scaling system 106 can modify (e.g., increase, decrease, and/or maintain) computing resource metrics available on a node of a cloud-based computing cluster (e.g., increase and/or decrease the CPU clock speed, the amount of RAM, the amount of storage, the amount of network bandwidth available on the node, the amount of power or energy available to the node). Indeed, the digital dynamic auto-scaling system 106 can modify any combination of computing resource metrics available. Furthermore, the digital dynamic auto-scaling system 106 can modify computing resource utilization for any combination of nodes (e.g., provide different computing resource utilization for individual nodes). Moreover, the digital dynamic auto-scaling system 106 can also modify computing resource utilization to an entire computing cluster (e.g., each node of a computing cluster) and/or to multiple computing clusters.

In addition, the digital dynamic auto-scaling system 106 can also modify one or more cloud-based computing clusters by modifying task allocations corresponding to the cloud-based computing clusters (and/or nodes of the cloud-based computing clusters). For instance, the digital dynamic auto-scaling system 106 can modify (or change) the number of computing tasks assigned to a cloud-based computing cluster and/or a node within the cloud-based computing cluster (e.g., by increasing, decreasing, or maintaining the number of computing tasks). Furthermore, the digital dynamic auto-scaling system 106 can also modify (or change) a type of computing tasks (e.g., based on a degree of complexity associated with the computing task) assigned to a cloud-based computing cluster (or a node of the cloud-based computing cluster). Indeed, the digital dynamic auto-scaling system 106 can increase and/or decrease the computing tasks associated with the cloud-based computing cluster (or a node) based on the degree of complexity (e.g., assign more computing tasks that require a greater amount of processing power and/or remove computing tasks that require a greater amount of processing power). Furthermore, the digital dynamic auto-scaling system 106 can modify task allocations for any combination of cloud-based computing clusters and/or nodes belonging to the cloud-based computing clusters.

Additionally, the digital dynamic auto-scaling system 106 can modify one or more cloud-based computing clusters belonging to multiple cloud service providers using a determined auto-scaling action. For instance, the digital dynamic auto-scaling system 106 can implement an auto-scaling action (determined in accordance with one or more embodiments herein) to modify a computing resource allocation, computing resource utilization, and/or computing task allocation associated with the one or more cloud-based computing clusters belonging to multiple cloud service providers (e.g., between the cloud service providers). For example, FIG. 6 illustrates the digital dynamic auto-scaling system 106 modifying one or more cloud-based computing clusters belonging to multiple cloud service providers using a determined auto-scaling action.

Figure 6:
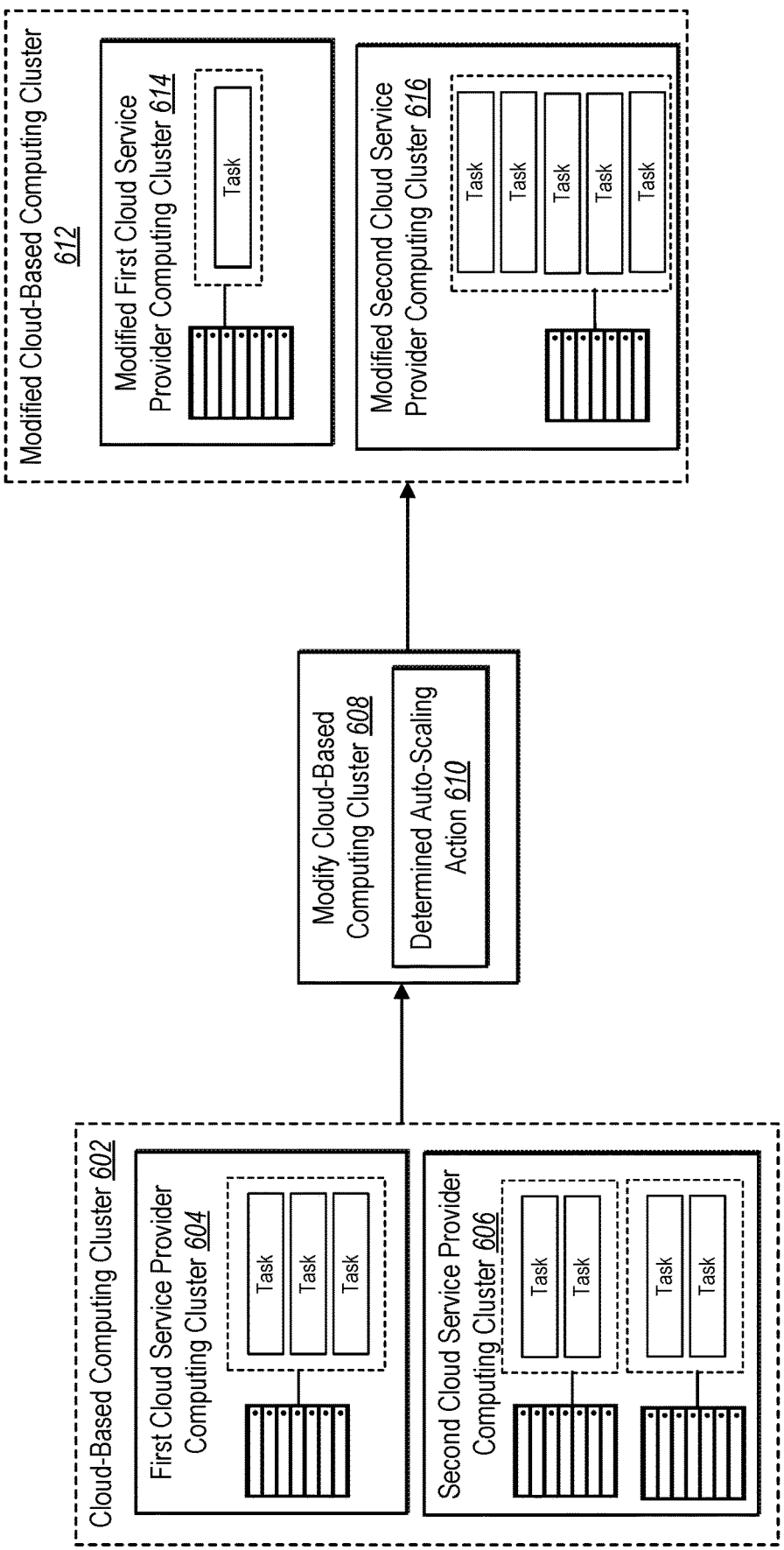
FIG. 6 illustrates a schematic diagram of the digital dynamic auto-scaling system modifying a cloud-based computing cluster having multiple cloud service provider computing clusters in accordance with one or more embodiments.

In particular, as shown in FIG. 6, the digital dynamic auto-scaling system 106 modifies a cloud-based computing cluster 602 having a first cloud service provider computing cluster 604 and a second cloud service provider computing cluster 606. As illustrated in FIG. 6, the first cloud service provider computing cluster 604 includes a node and assigned computing tasks that belong to the first cloud service provider. Moreover, as shown in FIG. 6, the second cloud service provider computing cluster 606 includes nodes and assigned computing tasks that belong to the second cloud service provider. As shown in FIG. 6, the digital dynamic auto-scaling system 106 modifies the cloud-based computing cluster in an act 608 using a determined auto-scaling action 610 (e.g., determined in accordance with one or more embodiments herein). For example, the digital dynamic auto-scaling system 106 can make one or more API calls to the first or second cloud service providers to modify the computing clusters 604, 606.

Indeed, as shown in FIG. 6, the digital dynamic auto-scaling system 106 modifies the cloud-based computing cluster 602 to create (or generate) a modified cloud-based computing cluster 612. In particular, as illustrated in FIG. 6, the digital dynamic auto-scaling system 106 decreases the number of computing tasks belonging to the first cloud service provider computing cluster 604 to generate a modified first cloud service provider computing cluster 614. For example, the digital dynamic auto-scaling system 106 can send an API call to the first cloud service provider with instructions to decrease the number of computing tasks belonging to the first cloud service provider computing cluster 604.

Moreover, as shown in FIG. 6, the digital dynamic auto-scaling system 106 decreases the number of nodes and increases the number of computing tasks belonging to the second cloud service provider computing cluster 606 to generate a modified second cloud service provider computing cluster 616. For example, the digital dynamic autoscaling system 106 can send an API call to the second cloud service provider with instructions to decrease the number of computing tasks belonging to the second cloud service provider computing cluster 606.

In one or more embodiments, the digital dynamic auto-scaling system 106 can modify a cloud-based computing cluster as described above (e.g., modifying a computing resource allocation, computing resource utilization, and/or computing task allocation) for separate cloud service provider computing clusters (e.g., within a cloud-based computing cluster having multiple cloud-based computing clusters belonging to individual cloud service providers). As an example, the digital dynamic auto-scaling system 106 can modify (or change) a computing resource and/or computing task allocation between multiple cloud service provider computing clusters based on a determined auto-scaling action in accordance with one or more embodiments herein. For instance, the digital dynamic auto-scaling system 106 can move computing tasks from a service provider computing cluster to another cloud service provider computing cluster. Moreover, the digital dynamic auto-scaling system 106 can also remove nodes associated with a service provider computing cluster and increase the number of nodes associated with another cloud service provider computing cluster.

Furthermore, the digital dynamic auto-scaling system 106 can also modify (or change) computing resource utilization in between cloud service provider computing clusters based on a determined auto-scaling action in accordance with one or more embodiments herein. For example, the digital dynamic auto-scaling system 106 can decrease computing resource utilization (e.g., RAM, storage space, bandwidth, etc.) used on a cloud service provider computing cluster and increase computing resource utilization on another cloud service provider computing cluster. Indeed, the digital dynamic auto-scaling system 106 can modify computing resource utilization on individual nodes belonging to the multiple cloud service provider computing clusters. Indeed, the digital dynamic auto-scaling system 106 can modify a computing resource allocation, computing resource utilization, and/or computing task allocation between any number of cloud service providers in accordance with one or more embodiments herein.

In addition, the digital dynamic auto-scaling system 106 can iteratively repeat the processes of determining one or more proposed auto-scaling actions, determining an auto-scaling action to perform, and modifying one or more cloud-based computing clusters based on the determined auto-scaling action. For example, the digital dynamic auto-scaling system 106 can determine an auto-scaling action to perform from proposed auto-scaling actions and modify one or more cloud-based computing clusters using the determined auto-scaling action after a configured (or selected) interval of time (e.g., every 30 seconds, every 10 minutes, every hour, etc.). Indeed, the digital dynamic auto-scaling system 106 can determine a configured interval of time from a preference provided by an administrator and/or based on the amount of modifications (or changes) occurring on the one or more cloud-based computing clusters (e.g., based on previously determined auto-scaling actions).

As illustrated by the foregoing description, the digital dynamic auto-scaling system 106 can comprise an abstraction layer on top of cloud infrastructure providers (cloud service providers) that allows auto-scaling decisions to be made independent from a given cloud infrastructure provider. For example, in one or more embodiments, one or more of the scaling models are specific to given cloud service providers. The digital dynamic auto-scaling system 106 can receive proposed auto-scaling actions from multiple cloud service providers using their specific scaling models. The digital dynamic auto-scaling system 106 can then determine which proposed auto-scaling action is best for the cloud-based computing cluster. As such, the digital dynamic auto-scaling system 106 can determine to modify the nodes of a cloud-based computing cluster of a first cloud service provider based on a scaling model not employed by the first cloud service provider, such as a scaling model of another cloud service provider.

Figure 7:
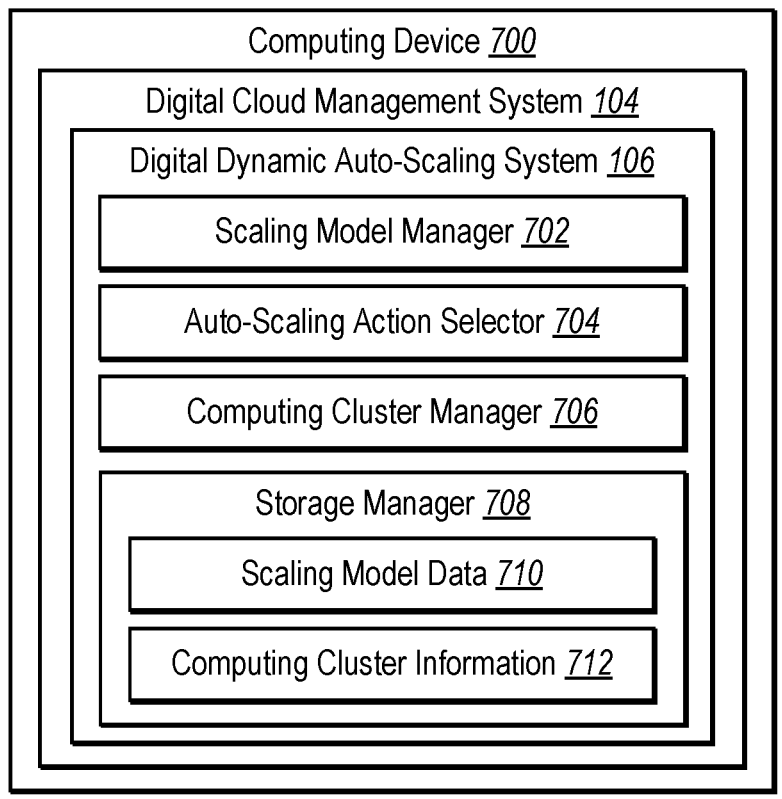
FIG. 7 illustrates an example architecture of the digital dynamic auto-scaling system in accordance with one or more embodiments.

Turning now to FIG. 7, additional detail will be provided regarding components and capabilities of one or more embodiments of the digital dynamic auto-scaling system. In particular, FIG. 7 illustrates an embodiment of an example digital dynamic auto-scaling system 106 executed by a computing device 700 (e.g., the server device(s) 102, server device(s) 108, cloud-based computing cluster 112, and/or the client device 116). As shown by the embodiment in FIG. 7, the computing device 700 can include or host the digital cloud management system 104 and the digital dynamic auto-scaling system 106. The digital dynamic auto-scaling system 106 can include a scaling model manager 702, an auto-scaling action selector 704, a computing cluster manager 706, and a storage manager 708 which can include scaling model data 710 and computing cluster information 712.

As just mentioned, and as illustrated in the embodiment in FIG. 7, the digital dynamic auto-scaling system 106 can include the scaling model manager 702. For example, the scaling model manager 702 can utilize one or more scaling models to determine proposed auto-scaling actions and/or confidence scores as described above (e.g., in relation to FIG. 3). Furthermore, the scaling model manager 702 can provide cloud-based computing cluster information to analyze and determine proposed auto-scaling actions from one or more scaling models as described above (e.g., in relation to FIG. 3).

Additionally, as shown in FIG. 7, the digital dynamic auto-scaling system 106 can include the auto-scaling action selector 704. For instance, the auto-scaling action selector 704 can utilize multiple proposed auto-scaling actions and corresponding confidence scores to determine an auto-scaling action to perform as described above (e.g., in relation to FIG. 4). In particular, the auto-scaling action selector 704 can determine an auto-scaling action to perform based on a comparison of confidence scores corresponding to proposed auto-scaling actions and/or a comparison of the confidence scores to a threshold confidence score as described above (e.g., in relation to FIG. 4).

In addition, as shown in FIG. 7, the digital dynamic auto-scaling system 106 can include the computing cluster manager 706. For example, the computing cluster manager 706 can modify (or manipulate) one or more cloud-based computing clusters using a determined auto-scaling action as described above (e.g., in relation to FIG. 5). Moreover, the computing cluster manager 706 can modify one or more cloud-based computing clusters belonging to multiple cloud service providers using a determined auto-scaling action as described above (e.g., in relation to FIG. 6).

Furthermore, as illustrated in FIG. 7, the digital dynamic auto-scaling system 106 can include the storage manager 708. In some embodiments, the storage manager 708 can be implemented by one or more memory devices. The storage manager 708 can maintain data to perform one or more functions of the digital dynamic auto-scaling system 106. As shown in FIG. 7, the storage manager 708 can include the scaling model data 710 (e.g., scaling models, proposed auto-scaling actions, confidence scores, and/or preferences for selecting auto-scaling action) and the computing cluster information 712 (e.g., information associated with one or more cloud-based computing clusters, mappings and/or associations to computing resources belonging to one or more cloud-based computing clusters, and/or cloud service provider information).

Each of the components 702-712 of the computing device 700 (e.g., the computing device 700 implementing the digital dynamic auto-scaling system 106), as shown in FIG. 7, may be in communication with one another using any suitable communication technologies. It will be recognized that although components 702-712 of the computing device 700 (or computer device) are shown to be separate in FIG. 7, any of components 702-712 may be combined into fewer components, such as into a single facility or module, divided into more components, or configured into different components as may serve a particular embodiment.

The components 702-712 of the computing device 700 can comprise software, hardware, or both. For example, the components 702-712 can comprise one or more instructions stored on a computer-readable storage medium and executable by processors of one or more computing devices. When executed by the one or more processors, the computer-executable instructions of the digital dynamic auto-scaling system 106 (e.g., via the computing device 700) can cause a client device and/or a server device to perform the methods described herein. Alternatively, the components 702-712 and their corresponding elements can comprise hardware, such as a special purpose processing device to perform a certain function or group of functions. Additionally, the components 702-712 can comprise a combination of computer-executable instructions and hardware.

Furthermore, the components 702-712 of the digital dynamic auto-scaling system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-712 may be implemented as a stand-alone application, such as a desktop or mobile application. Furthermore, the components 702-712 may be implemented as one or more web-based applications hosted on a remote server. The components 702-712 may also be implemented in a suite of mobile device applications or "apps." To illustrate, the components 702-712 may be implemented in an application, including but not limited to, ADOBE® SENSEI, ADOBE® ANALYTICS CLOUD, ADOBE® ANALYTICS, ADOBE® AUDIENCE MANAGER, ADOBE® CAMPAIGN, ADOBE® EXPERIENCE MANAGER, and ADOBE® TARGET. "ADOBE," "ADOBE SENSEI," "ADOBE ANALYTICS CLOUD," "ADOBE ANALYTICS," "ADOBE AUDIENCE MANAGER," "ADOBE CAMPAIGN," "ADOBE EXPERIENCE MANAGER," and "ADOBE TARGET." are either registered trademarks or trademarks of Adobe Inc. in the United States and/or other countries.

Figure 8:
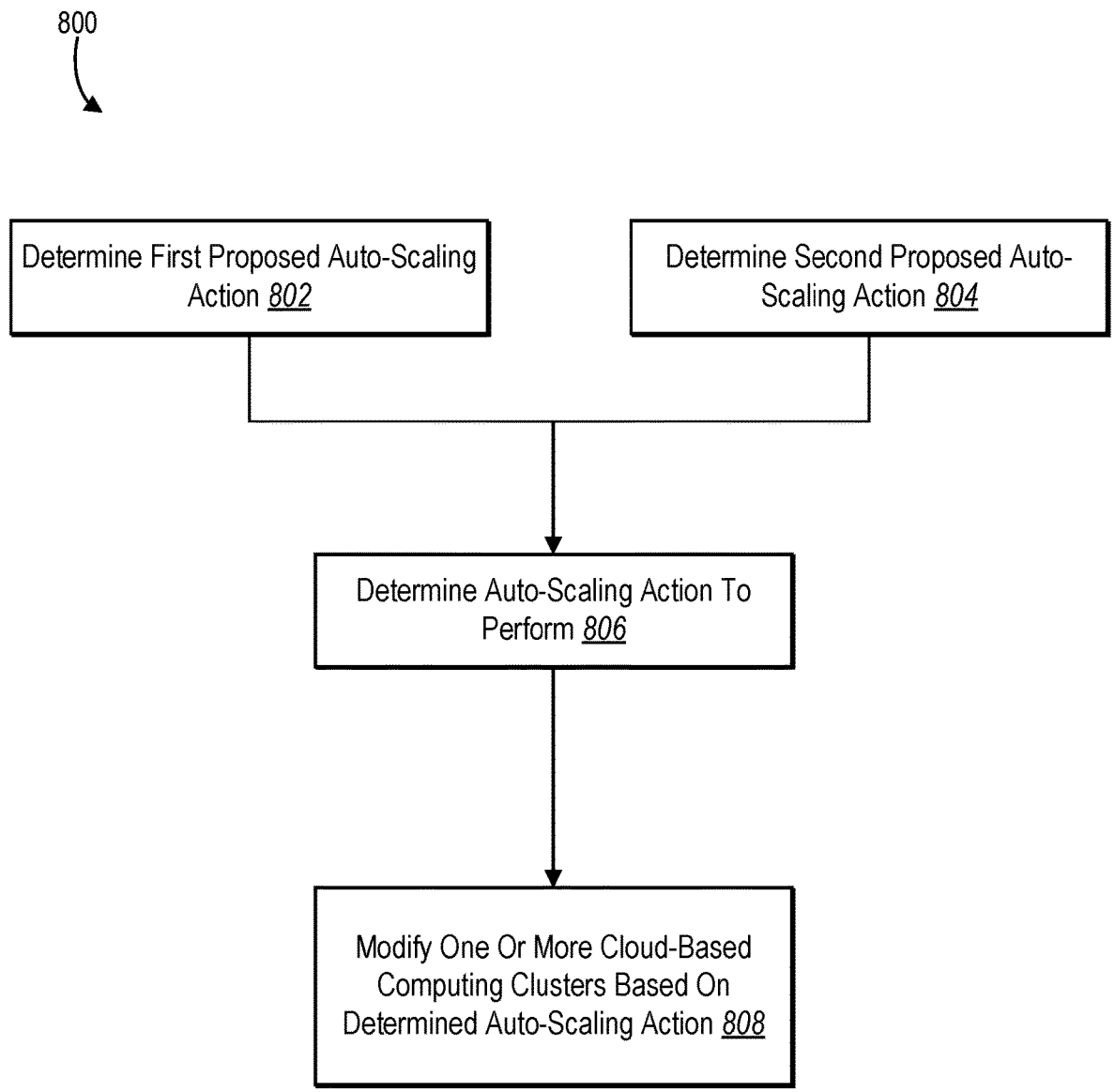
FIG. 8 illustrates a flowchart of a series of acts for determining an auto-scaling action for a cloud-based computing cluster based on multiple proposed auto-scaling actions from multiple scaling models in accordance with one or more embodiments.

FIGS. 1-7, the corresponding text, and the examples provide a number of different methods, systems, devices, and non-transitory computer-readable media of the digital dynamic auto-scaling system 106. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned above, FIG. 8 illustrates a flowchart of a series of acts 800 for determining an auto-scaling action for a cloud-based computing cluster based on multiple proposed auto-scaling actions from multiple scaling models in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As illustrated in FIG. 8, the series of acts 800 include an act 802 of determining a first proposed auto-scaling action. In particular, the act 802 can include determining a first proposed auto-scaling action using a first scaling model (based on information associated with one or more cloud-based computing clusters). Additionally, the act 802 can include determining a first confidence score associated with a first proposed auto-scaling action. For example, information associated with one or more cloud-based computing clusters can include at least one of CPU utilization information, memory usage information, or network usage information. In addition, the act 802 can include determining a first proposed auto-scaling action by receiving a first proposed auto-scaling action from a first cloud-based service provider.

Furthermore, the act 802 can include determining a first proposed auto-scaling action using one of a reactive auto-scaling model, a forecasting auto-scaling model, or a reinforcement auto-scaling model. Moreover, a first proposed auto-scaling action can include instructions to increase or decrease computing resource utilization on one or more cloud-based computing clusters. For instance, a first proposed auto-scaling action can include instructions to increase computing resource utilization on one or more cloud-based computing clusters. Additionally, the act 802 can include determining a first proposed auto-scaling action and a first confidence score associated with the first proposed auto-scaling action using a forecasting auto-scaling model based on information associated with one or more cloud-based computing clusters.

As illustrated in FIG. 8, the series of acts 800 include an act 804 of determining a second proposed auto-scaling action. In particular, the act 804 can include determining a second proposed auto-scaling action using a second scaling model (based on information associated with one or more cloud-based computing clusters). Furthermore, the act 804 can include determining a second confidence score associated with a second proposed auto-scaling action. Additionally, the act 804 can include determining a second proposed auto-scaling action using another of a reactive auto-scaling model, a forecasting auto-scaling model, or a reinforcement auto-scaling model. Furthermore, the act 804 can include determining a second proposed auto-scaling action by receiving the second proposed auto-scaling action from a second cloud-based service provider. Moreover, the act 804 can include determining a second proposed auto-scaling action and a second confidence score associated with the second proposed auto-scaling action using a reinforcement auto-scaling model based on information associated with one or more cloud-based computing clusters. For example, a second proposed auto-scaling action can include instructions to decrease computing resource utilization on one or more cloud-based computing clusters.

Furthermore, the act 804 can include determining a third proposed auto-scaling action using a third scaling model. Additionally, the act 804 can include determining a third proposed auto-scaling action using a reactive auto-scaling model based on information associated with one or more cloud-based computing clusters.

As illustrated in FIG. 8, the series of acts 800 include an act 806 of determining an auto-scaling action to perform. In particular, the act 806 can include determining an auto-scaling action to perform based on a first proposed auto-scaling action and a second proposed auto-scaling action using a first confidence score and a second confidence score. Moreover, the act 806 can include determining an auto-scaling action to perform by selecting between a first proposed auto-scaling action and a second auto-scaling action based on a comparison of a first confidence score and a second confidence score. For example, the act 806 can include determining an auto-scaling action to perform by selecting a second proposed auto-scaling action based on a comparison of a first confidence score and a second confidence score.

Moreover, the act 806 can include determining an auto-scaling action to perform by selecting between a first proposed auto-scaling action, a second proposed auto-scaling action, and a third proposed auto-scaling action based on a first confidence score and a second confidence score. Additionally, the act 806 can include determining an auto-scaling action to perform by selecting a third proposed auto-scaling action based on determining that a first confidence score and a second confidence score do not satisfy a threshold confidence score.

In addition to (or in the alternative to) the acts above, the digital dynamic auto-scaling system 106 can also perform a step for determining an auto-scaling action to perform based on a first proposed auto-scaling action and a second proposed auto-scaling action. For example, the acts and algorithms described above in relation to FIG. 4 (e.g., the acts 402-404) can comprise the corresponding acts and algorithms (i.e., structures) for performing a step for determining an auto-scaling action to perform based on a first proposed auto-scaling action and a second proposed auto-scaling action.

As illustrated in FIG. 8, the series of acts 800 include an act 808 of modifying one or more cloud-based computing clusters based on a determined auto-scaling action. In particular, the act 808 can include modifying one or more cloud-based computing clusters by modifying a computing resource allocation associated with one or more cloud-based computing clusters based on a determined auto-scaling action. Additionally, the act 808 can include modifying one or more cloud-based computing clusters by allocating computing resources between multiple cloud-based service providers.

For example, one or more cloud-based computing clusters can include a first set of computing resources from a first cloud-based service provider and a second set of computing resources from a second cloud-based service provider. Furthermore, the act 808 can include modifying one or more cloud-based computing clusters based on a determined auto-scaling action by allocation a computing task from a first set of computing resources to a second set of computing resources.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
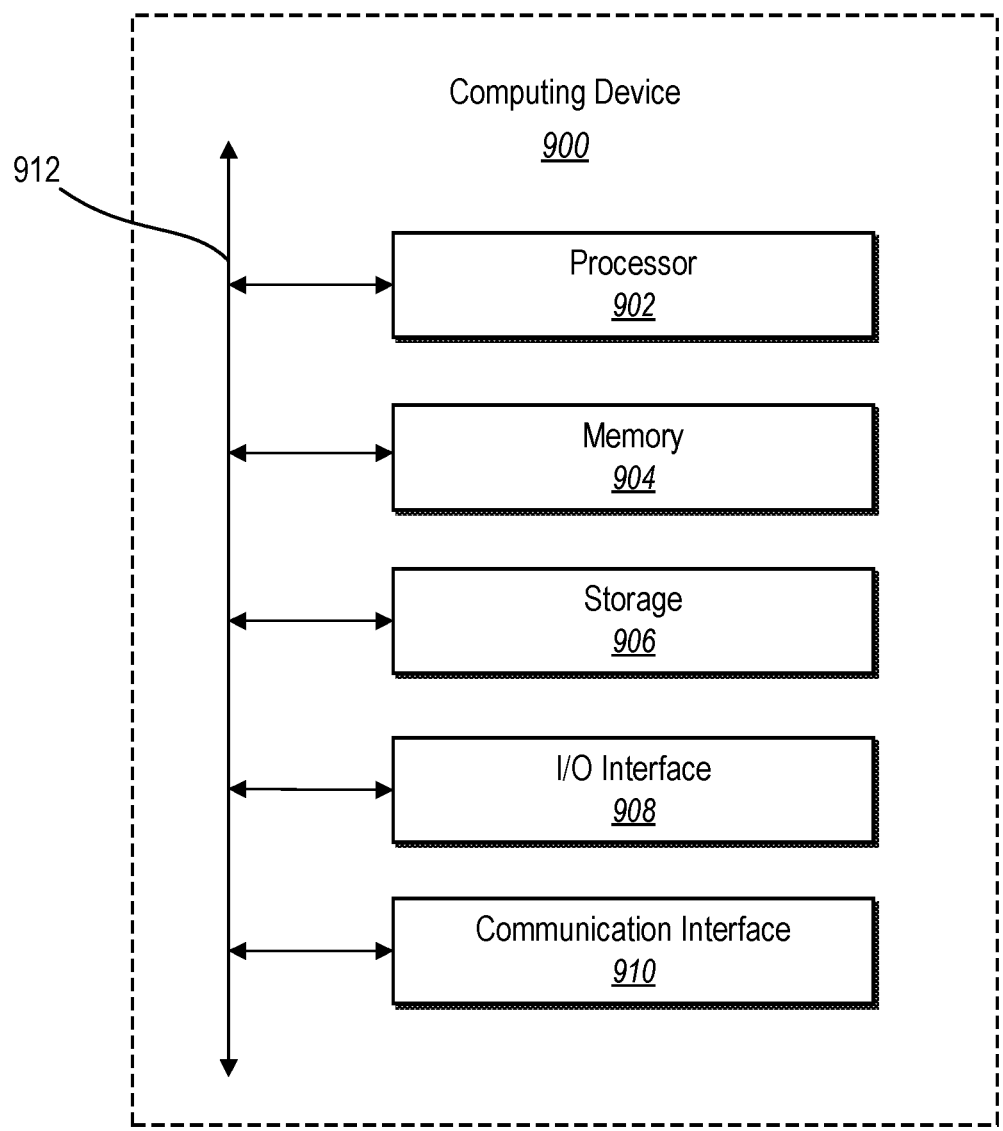
FIG. 9 illustrates a block diagram of an example computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., computing device 700, server device(s) 102, server device(s) 108, cloud-based computing cluster 112, and client device 116). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer device to:
   determine a first proposed auto-scaling action using a first scaling model based on information associated with one or more cloud-based computing clusters;
   determine a first confidence score that corresponds to an accuracy of the first scaling model generating auto-scaling actions in relation to the information associated with the one or more cloud-based computing clusters;
   determine a second proposed auto-scaling action using a second scaling model based on the information associated with the one or more cloud-based computing clusters;
   determine a second confidence score that corresponds to an accuracy of the second scaling model generating auto-scaling actions in relation to the information associated with the one or more cloud-based computing clusters;
   determine an auto-scaling action to perform based on the first proposed auto-scaling action and the second proposed auto-scaling action using the first confidence score and the second confidence score; and
   modify the one or more cloud-based computing clusters based on the determined auto-scaling action.

2. The non-transitory computer-readable medium of claim 1, further comprising instructions, that when executed by the at least one processor, cause the computer device to determine the auto-scaling action to perform by selecting between the first proposed auto-scaling action and the second proposed auto-scaling action based on a comparison of the first confidence score and the second confidence score.

3. The non-transitory computer-readable medium of claim 1, further comprising instructions that, when executed by the at least one processor, cause the computer device to:
   determine a third proposed auto-scaling action using a third scaling model; and
   determine the auto-scaling action to perform by selecting the third proposed auto-scaling action based on determining that the first confidence score and the second confidence score do not satisfy a threshold confidence score.

4. The non-transitory computer-readable medium of claim 1, wherein the information associated with the one or more cloud-based computing clusters comprises at least one of CPU utilization information, memory usage information, or network usage information.

5. The non-transitory computer-readable medium of claim 1, further comprising instructions, that when executed by the at least one processor, cause the computer device to modify the one or more cloud-based computing clusters by modifying a computing resource allocation associated with the one or more cloud-based computing clusters based on the determined auto-scaling action.

6. The non-transitory computer-readable medium of claim 1, further comprising instructions, that when executed by the at least one processor, cause the computer device to:
   determine the first proposed auto-scaling action using one of a reactive auto-scaling model, a forecasting auto-scaling model, or a reinforcement auto-scaling model; and
   determine the second proposed auto-scaling action using another of the reactive auto-scaling model, the forecasting auto-scaling model, or the reinforcement auto-scaling model.

7. The non-transitory computer-readable medium of claim 1, wherein the one or more cloud-based computing clusters comprise a first set of computing resources from a first cloud-based service provider and a second set of computing resources from a second cloud-based service provider and further comprising instructions, that when executed by the at least one processor, cause the computer device to modify the one or more cloud-based computing clusters based on the determined auto-scaling action by allocating a computing task from the first set of computing resources to the second set of computing resources.

8. The non-transitory computer-readable medium of claim 1, wherein the first proposed auto-scaling action comprises instructions to increase or decrease computing resource utilization on the one or more cloud-based computing clusters.

9. The non-transitory computer-readable medium of claim 1, further comprising instructions, that when executed by the at least one processor, cause the computer device to:
   determine the first proposed auto-scaling action by receiving the first proposed auto-scaling action from a first cloud-based service provider; and
   determine the second proposed auto-scaling action by receiving the second proposed auto-scaling action from a second cloud-based service provider.

10. A system comprising:
    one or more memory devices comprising:
       a forecasting auto-scaling model;
       a reinforcement auto-scaling model;
       a reactive auto-scaling model; and
       information associated with one or more cloud-based computing clusters; and one or more server devices that cause the system to:
- determine a first proposed auto-scaling action and a first confidence score associated with the first proposed auto-scaling action using the forecasting auto-scaling model based on the information associated with the one or more cloud-based computing clusters, the first confidence score corresponding to an accuracy of the forecasting auto-scaling model;
- determine a second proposed auto-scaling action and a second confidence score associated with the second proposed auto-scaling action using the reinforcement auto-scaling model based on the information associated with the one or more cloud-based computing clusters, the second confidence score corresponding to an accuracy of the reinforcement auto-scaling model;
- determine a third proposed auto-scaling action using the reactive auto-scaling model based on the information associated with the one or more cloud-based computing clusters;
- determine an auto-scaling action to perform by selecting between the first proposed auto-scaling action, the second proposed auto-scaling action, and the third proposed auto-scaling action based on the first confidence score and the second confidence score; and
- modify the one or more cloud-based computing clusters by modifying a computing resource allocation associated with the one or more cloud-based computing clusters based on the determined auto-scaling action.

11. The system of claim 10, wherein:
the one or more cloud-based computing clusters comprise a first set of computing resources from a first cloud-based service provider and a second set of computing resources from a second cloud-based service provider and
the one or more server devices cause the system to modify the one or more cloud-based computing clusters by allocating a computing task from the first set of computing resources to the second set of computing resources.

12. The system of claim 10, wherein the one or more server devices cause the system to determine the auto-scaling action to perform by selecting the third proposed auto-scaling action based on determining that the first confidence score and the second confidence score do not satisfy a threshold confidence score.

13. The system of claim 10, wherein the information associated with the one or more cloud-based computing clusters comprises at least one of CPU utilization information, memory usage information, or network usage information.

14. The system of claim 10, wherein:
the first proposed auto-scaling action comprises instructions to increase computing resource utilization on the one or more cloud-based computing clusters; and
the second proposed auto-scaling action comprises instructions to decrease computing resource utilization on the one or more cloud-based computing clusters.

15. The system of claim 14, wherein the one or more server devices cause the system to determine the auto-scaling action to perform by selecting the second proposed auto-scaling action based on a comparison of the first confidence score and the second confidence score.

16. The system of claim 10, wherein the one or more server devices cause the system to:
- determine the first proposed auto-scaling action by receiving the first proposed auto-scaling action from a first cloud-based service provider; and
- determine the second proposed auto-scaling action by receiving the second proposed auto-scaling action from a second cloud-based service provider.

17. A computer-implemented method for dynamically scaling cloud-based computing resources, the computer-implemented method comprising:
- determining a first proposed auto-scaling action using a first scaling model;
- determining a second proposed auto-scaling action using a second scaling model;
- performing a step for determining an auto-scaling action to perform based on the first proposed auto-scaling action and the second proposed auto-scaling action; and
- modifying one or more cloud-based computing clusters based on the determined auto-scaling action.

18. The computer-implemented method of claim 17, wherein modifying the one or more cloud-based computing clusters comprises allocating computing resources between multiple cloud-based service providers.

19. The computer-implemented method of claim 17, wherein modifying the one or more cloud-based computing clusters comprises modifying a computing resource allocation associated with the one or more cloud-based computing clusters based on the determined auto-scaling action.

20. The computer-implemented method of claim 17, wherein:
- determining the first proposed auto-scaling action comprises receiving the first proposed auto-scaling action from a first cloud-based service provider; and
- determining the second proposed auto-scaling action comprises receiving the second proposed auto-scaling action from a second cloud-based service provider.

* * * * *